United States Patent
Nakamura et al.

(10) Patent No.: US 10,594,176 B2
(45) Date of Patent: Mar. 17, 2020

(54) ROTOR, ROTATING ELECTRIC MACHINE, ELECTRIC COMPRESSOR, AND REFRIGERATION/AIR-CONDITIONING APPARATUS

(71) Applicant: Mitsubishi Electric Corporation, Chiyoda-ku, Tokyo (JP)

(72) Inventors: Hideyuki Nakamura, Tokyo (JP); Kazuhiro Shono, Tokyo (JP); Yuki Tamura, Tokyo (JP); Koji Masumoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 210 days.

(21) Appl. No.: 15/737,412

(22) PCT Filed: Aug. 19, 2016

(86) PCT No.: PCT/JP2016/074178
§ 371 (c)(1),
(2) Date: Dec. 18, 2017

(87) PCT Pub. No.: WO2017/038489
PCT Pub. Date: Mar. 9, 2017

(65) Prior Publication Data
US 2018/0138763 A1 May 17, 2018

(30) Foreign Application Priority Data
Sep. 1, 2015 (JP) .................................. 2015-171615

(51) Int. Cl.
*H02K 29/03* (2006.01)
*H02K 1/27* (2006.01)
(Continued)

(52) U.S. Cl.
CPC .............. *H02K 1/276* (2013.01); *F04B 35/04* (2013.01); *F04B 39/00* (2013.01);
(Continued)

(58) Field of Classification Search
CPC .. H02K 1/1766; H02K 1/276; H02K 2213/03; H02K 29/03
See application file for complete search history.

(56) References Cited

U.S. PATENT DOCUMENTS

2002/0175583 A1* 11/2002 Kikuchi ................. H02K 16/02
310/156.56
2007/0057589 A1 3/2007 Tatematsu et al.
(Continued)

FOREIGN PATENT DOCUMENTS

| CN | 102403862 A | 4/2012 |
| CN | 105027391 A | 11/2015 |

(Continued)

OTHER PUBLICATIONS

Office Action (Notification of Reasons for Refusal) dated Mar. 5, 2019, by the Japanese Patent Office in corresponding Japanese Patent Application No. 2017-537735 and English translation of the Office Action. (7 pages).

(Continued)

*Primary Examiner* — Dang D Le
(74) *Attorney, Agent, or Firm* — Buchanan Ingersoll & Rooney PC

(57) ABSTRACT

A rotor core is configured by stacking a plurality of core plates each including: an inner peripheral side core portion; an outer peripheral side core portion; a magnet insertion hole; a radial connection portion to be connected to the inner peripheral side core portion; a circumferential connection portion to be connected between the outer peripheral side core portion and the radial connection portion, including a (Continued)

minimum width portion having a width smaller than widths at both ends, and having a width smoothly decreasing from both ends toward the minimum width portion; and a thin portion including a uniform thickness portion which is provided in the circumferential connection portion and which has a uniform thickness and a non-uniform thickness portion which is adjacent to the uniform thickness portion and which has an increasing thickness, the thin portion having the minimum width portion within the uniform thickness portion.

20 Claims, 19 Drawing Sheets

(51) Int. Cl.
*F04B 35/04* (2006.01)
*H02K 7/14* (2006.01)
*F04B 39/02* (2006.01)
*F04B 39/00* (2006.01)
*F04C 29/04* (2006.01)
*F04C 23/00* (2006.01)
*F04C 23/02* (2006.01)
*F25B 31/02* (2006.01)
*F25B 13/00* (2006.01)
*F04C 18/02* (2006.01)

(52) U.S. Cl.
CPC ........ *F04B 39/0261* (2013.01); *F04C 23/008* (2013.01); *F04C 23/02* (2013.01); *F04C 29/04* (2013.01); *F04C 29/045* (2013.01); *F25B 31/026* (2013.01); *H02K 1/2766* (2013.01); *H02K 7/14* (2013.01); *F04C 18/0215* (2013.01); *F04C 2240/40* (2013.01); *F25B 13/00* (2013.01)

(56) References Cited

U.S. PATENT DOCUMENTS

| 2009/0152972 | A1* | 6/2009 | Nishijima | H02K 1/276 |
| | | | | 310/156.57 |
| 2010/0308686 | A1 | 12/2010 | Mathoy | |
| 2012/0060547 | A1 | 3/2012 | Fujisue et al. | |
| 2012/0274168 | A1 | 11/2012 | Holzner et al. | |
| 2013/0119817 | A1 | 5/2013 | Arimatsu et al. | |
| 2016/0285326 | A1* | 9/2016 | Kawamura | H02K 1/276 |

FOREIGN PATENT DOCUMENTS

| JP | 2005-185081 A | 7/2005 |
| JP | 2007-74870 A | 3/2007 |
| JP | 2008-154299 A | 7/2008 |
| JP | 2011-97754 A | 5/2011 |
| JP | 2012-60799 A | 3/2012 |
| JP | 2013-128384 A | 6/2013 |
| JP | 2013-531462 A | 8/2013 |
| WO | WO 2013/105236 A1 | 7/2013 |
| WO | WO 2014/156090 A1 | 10/2014 |

OTHER PUBLICATIONS

Office Action (Notification of Reasons for Refusal) dated Jul. 3, 2018, by the Japanese Patent Office in corresponding Japanese Patent Application No. 2017-537735 and English translation of the Office Action. (7 pages).

Office Action dated Mar. 19, 2019, by the Chinese Patent Office in corresponding Chinese Patent Application No. 201680046694.X and English translation of the Office Action. (21 pages).

International Search Report (PCT/ISA/210) dated Nov. 8, 2016, by the Japanese Patent Office as the International Searching Authority for International Application No. PCT/JP2016/074178.

Written Opinion (PCT/ISA/237) dated Nov. 8, 2016, by the Japanese Patent Office as the International Searching Authority for International Application No. PCT/JP2016/074178.

* cited by examiner

ROTOR, ROTATING ELECTRIC MACHINE, ELECTRIC COMPRESSOR, AND REFRIGERATION/AIR-CONDITIONING APPARATUS

TECHNICAL FIELD

The present invention relates to a rotor for a permanent-magnet-embedded-type rotating electric machine. In addition, the present invention relates to an electric compressor using the rotating electric machine, and a refrigeration/air-conditioning apparatus including the electric compressor.

BACKGROUND ART

A rotating electric machine in which permanent magnets are used in a rotor rotates the rotor by interaction between a magnetic field generated by each permanent magnet embedded in the rotor and a magnetic field generated by applying a current to a coil provided in a stator, thereby providing power. Such a rotating electric machine has been widely used in an electric compressor of a refrigeration/air-conditioning apparatus such as an air-conditioning apparatus or a freezer using a refrigeration cycle, a motor generator of an electric vehicle or a hybrid electric vehicle, and the like.

The rotor of such a rotating electric machine is configured by stacking a plurality of core plates, each composed of a circular electromagnetic steel sheet having a plurality of magnet insertion holes, such that n-fold symmetry is achieved so as to correspond to a number of magnetic poles n (n is an even number equal to or greater than 2). In each core plate, a region forming the center side with respect to the magnet insertion holes forms an inner peripheral side core portion, and a region forming the outer peripheral side with respect to the magnet insertion holes forms an outer peripheral side core portion. The inner peripheral side core portion and the outer peripheral side core portion are connected to each other via a plurality of connection portions.

In the rotor of the rotating electric machine configured as described above, a part of a magnetic flux generated from the permanent magnet embedded in each magnet insertion hole does not reach the stator, and a magnetic short circuit occurs in which a loop is formed so as to pass through the inner peripheral side core portion, the connection portions, and the outer peripheral side core portion and be closed at the front and the back of the permanent magnet. Since the magnetic flux due to the magnetic short circuit does not reach the stator, the magnetic flux does not contribute to rotation of the rotor at all and becomes a leakage magnetic flux. Thus, such a magnetic flux becomes a factor for decreasing the performance of the rotating electric machine. In order to reduce such a magnetic short circuit, it is effective to decrease the cross-sectional area of each connection portion thereby to increase the magnetic resistance of each connection portion. The cross-sectional area of each connection portion can be decreased by decreasing the width of the connection portion or decreasing the thickness of the connection portion.

For example, in the rotor of a conventional rotating electric machine, a recess portion is formed in each connection portion, with a width equal to ⅓ to ½ of the width of the connection portion, by thinning a portion of the connection portion close to a magnet insertion hole by means of coining performed by pressing, whereby the cross-sectional area of the connection portion is decreased (see, for example, Patent Document 1).

CITATION LIST

Patent Document

Patent Document 1: Japanese Laid-Open Patent Publication No. 2005-185081

SUMMARY OF THE INVENTION

Problems to be Solved by the Invention

In the rotor of the conventional rotating electric machine disclosed in Patent Document 1, since the thickness of the portion of each connection portion is made smaller than that by means of coining, the cross-sectional area of the connection portion can be decreased, so that the magnetic resistance of the connection portion can be increased. However, in order to ensure strength sufficient to prevent the core plate from deforming due to stress generated by centrifugal force when the rotor rotates, the range of the portion thinned by means of coining is limited to the portion of the connection portion. That is, the thinned portion has a width equal to ⅓ to ½ of the width of the connection portion, and the thickness thereof is merely made equal to 80% to 98% of the original thickness, so that the cross-sectional area cannot be considered to be sufficiently decreased. Thus, there is a problem that the effect of reducing a leakage magnetic flux due to a magnetic short circuit is insufficient.

The present invention has been made to solve the above-described problem, and an object of the present invention is to provide: a rotor that allows sufficient strength to be ensured and allows a leakage magnetic flux to be sufficiently reduced, even when the thickness of each connection portion is decreased thereby to increase the magnetic resistance of the connection portion; a rotating electric machine including the rotor; an electric compressor using the rotating electric machine; and a refrigeration/air-conditioning apparatus including the electric compressor.

Solution to the Problems

A rotor according to the present invention includes:
a rotor core configured by stacking a plurality of core plates in a direction of a rotation axis such that positions of magnet insertion holes coincide with each other, each core plate including
an inner peripheral side core portion provided at the rotation axis side of the core plate having a shape with n-fold symmetry about the rotation axis so as to correspond to a number of magnetic poles,
an outer peripheral side core portion provided at an outer peripheral side of the core plate so as to correspond to each magnetic pole,
the magnet insertion hole provided between the inner peripheral side core portion and the outer peripheral side core portion so as to correspond to each magnetic pole,
a radial connection portion provided between each magnetic pole, connected to the inner peripheral side core portion, and extending in a radial direction of the core plate,
a circumferential connection portion connected to the outer peripheral side core portion and the radial connection portion, extending in a circumferential direction of the core plate, having widths w1 and w2 in the radial direction at both ends thereof, including a minimum width portion having a width w3 in the radial direction smaller than the w1 and the w2, and having a width smoothly decreasing from both ends thereof toward the minimum width portion, and a thin portion including a uniform thickness portion which is provided in the circumferential connection portion and which has a thickness tc over an entire width, in the radial direction, of the circumferential connection portion and a non-uniform thickness portion which is adjacent to the uniform thickness portion provided in the circumferential connection portion and which has a thickness increasing from tc to to, the thin portion having the minimum width portion within the uniform thickness portion; and permanent magnets embedded in the magnet insertion holes.

Effect of the Invention

With the rotor according to the present invention, a leakage magnetic flux due to a magnetic short circuit can be reduced and sufficient strength can be ensured.

DESCRIPTION OF EMBODIMENTS

Embodiment 1

Figure 1:
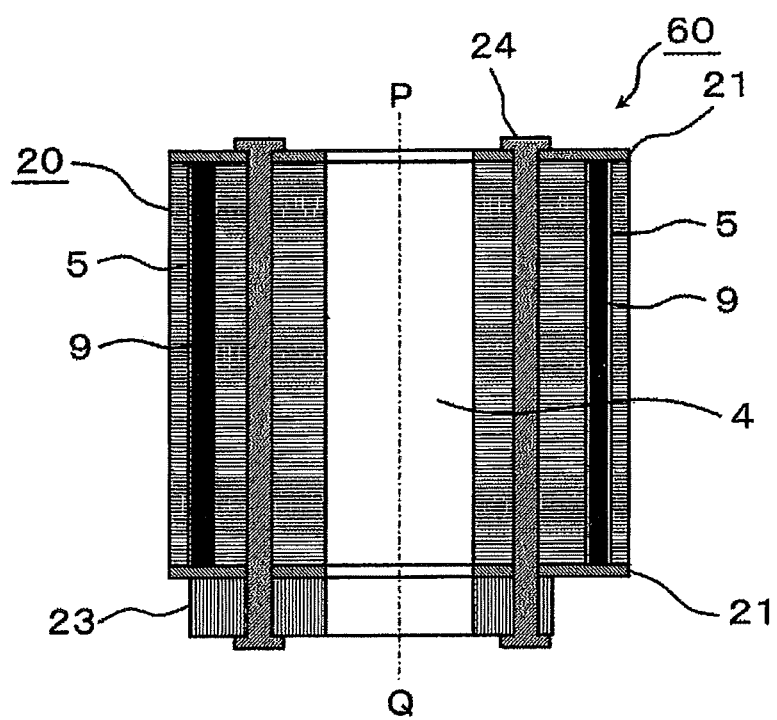
FIG. 1 is a cross-sectional view showing a vertical cross-sectional configuration of a rotor for a rotating electric machine according to Embodiment 1 of the present invention.

First, the configuration of a rotor for a rotating electric machine according to Embodiment 1 of the present invention will be described. FIG. 1 is a cross-sectional view showing a vertical cross-sectional configuration of the rotor for the rotating electric machine according to Embodiment 1 of the present invention. The rotating electric machine described in Embodiment 1 of the present invention is a rotating electric machine used in an electric compressor of a refrigeration/air-conditioning apparatus using a refrigeration cycle such as an air-conditioning apparatus and a freezer.

As shown in FIG. 1, the rotor 60 for the rotating electric machine includes: a rotor core 20 configured by stacking a plurality of core plates formed from electromagnetic steel sheets; permanent magnets 9 disposed within magnet insertion holes 5 provided in the rotor core 20; and end plates 21 provided at both ends of the rotor core 20. The rotor 60 for the rotating electric machine used in an electric compressor further includes, at the outer side of one of the end plates 21, a semicircular balance weight 23 for keeping balance during rotation. The rotor core 20, the end plates 21, which are disposed at both ends of the rotor core 20, and the balance weight 23 are integrally fixed to each other by rivets 24, whereby the rotor 60 is configured. In addition, a shaft insertion hole 4 for passing a shaft that has a rotation axis indicated by an alternate long and short dash line P-Q is provided within the rotor core 20 and the end plates 21. In the above configuration, the balance weight 23 is not necessarily needed, and the rotor 60 may be configured without the balance weight 23. Moreover, examples of the permanent magnets 9 include plate-like rare-earth magnets containing neodymium, iron, or boron as a principal component, and plate-like ferrite magnets containing iron oxide as a principal component.

The rotating electric machine is configured by disposing a stator including a coil, around the cylindrical rotor configured as described above. The rotor can be rotated about the rotation axis by supplying a current to the coil of the stator.

Figure 2:
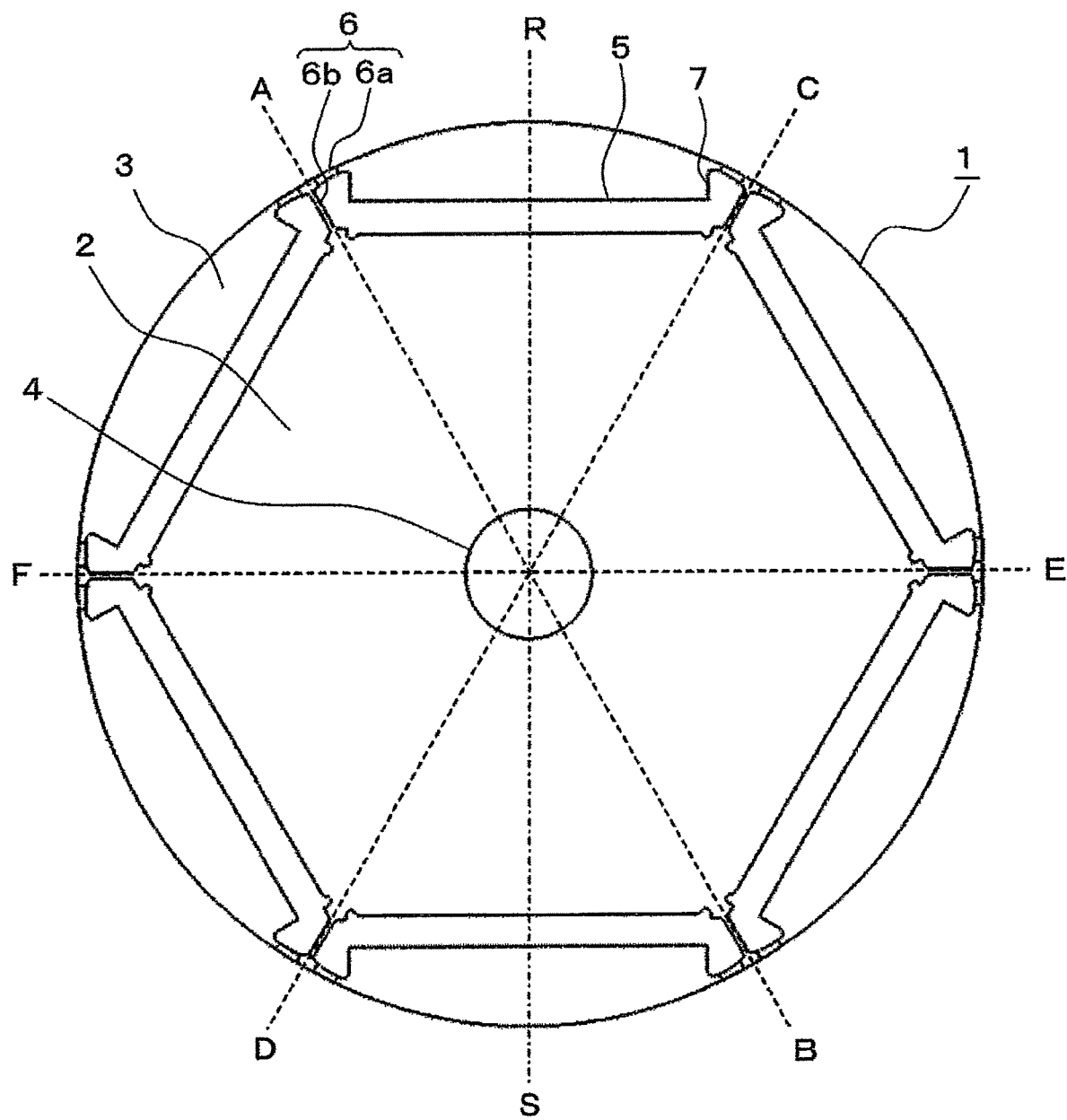
FIG. 2 is a plan view showing a core plate forming a rotor core of the rotor according to Embodiment 1 of the present invention.
Figure 3:
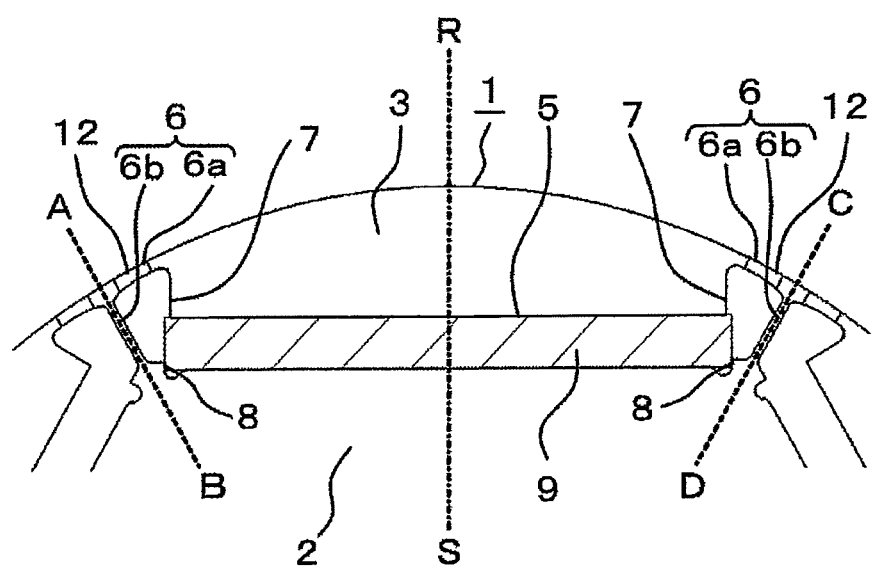
FIG. 3 is a partial plan view showing, in an enlarged manner, a part of the core plate forming the rotor core of the rotor for the rotating electric machine according to Embodiment 1 of the present invention.

FIG. 2 is a plan view showing the core plate forming the rotor core of the rotor shown in FIG. 1. In addition, FIG. 3 is a partial plan view showing, in an enlarged manner, a part of the core plate shown in FIG. 2. FIG. 3 also shows a permanent magnet for one pole.

As shown in FIG. 2, the core plate 1 is composed of an electromagnetic steel sheet that is formed in a circular shape and has a thickness of 0.1 to 1 mm and preferably 0.35 to 0.5 mm. When the number of magnetic poles is n (n is an even number equal to or greater than 2), the core plate 1 has a shape with n-order rotational symmetry. FIG. 2 shows the case where the number of magnetic poles is 6, and thus the core plate 1 has a shape with 6-fold symmetry. However, in the present invention, the number of magnetic poles is not limited to 6, and may be another number of magnetic poles such as 4 or 8.

When the 6-pole core plate 1 shown in FIG. 2 is equally divided into six equal sections by dashed lines A-B, C-D, and E-F passing through the center of the core plate 1, the equal sections have the same shape. Therefore, a partial shape for one pole among equal sections obtained by equally dividing the core plate 1 by 6, which is the number of magnetic poles, will be described below. When six partial shapes obtained by rotating the below-described partial shape for one pole by 0°, 60°, 120°, 180°, 240°, and 300° are combined, the entire shape of the core plate is formed. The same applies to the case where the number of magnetic poles is a number other than 6, and the core plate 1 has the properties of a rotational symmetry shape.

FIG. 3 shows apart of the core plate 1 that is a portion for one pole at the upper side of the drawing sheet between the dashed lines A-B and C-D in FIG. 2. In FIG. 3, the shaft insertion hole 4 is not shown. In FIGS. 2 and 3, an alternate long and short dash line R-S is the polar axis of the magnetic pole shown in FIG. 3, the polar axis passes through the center of the core plate 1, and the shape of the core plate 1 for one pole is formed so as to be line-symmetrical about the polar axis. Therefore, in the following description, for example, even when: the configuration for one pole as shown in FIG. 3 is shown in a partial plan view; the configuration at the left side of the drawing sheet with respect to the polar axis indicated by the alternate long and short dash line R-S is described; and the description of the right side of the drawing sheet is omitted, since the left side of the drawing sheet and the right side of the drawing sheet are line-symmetrical to each other about the polar axis, the configuration at the right side of the drawing sheet may be understood to be the same as that at the left side of the drawing sheet, and vice versa. In addition, except for the case where it is necessary to particularly distinguish between the configuration at the left side of the drawing sheet and the configuration at the right side of the drawing sheet with respect to the polar axis, the same components at the left side of the drawing sheet and the right side of the drawing sheet are denoted by the same reference characters.

As shown in FIGS. 2 and 3, the magnet insertion hole 5 having a longitudinal direction perpendicular to the polar axis is provided in the core plate 1, an inner peripheral side core portion 2 is provided at the center side of the core plate 1 with respect to the magnet insertion hole 5, and an outer peripheral side core portion 3 is provided at the outer puerperal side of the core plate 1 with respect to the magnet insertion hole 5. The inner peripheral side core portion 2 and the outer peripheral side core portion 3 are connected to each other by connection portions 6, and each connection portion 6 is composed of two regions, that is, a circumferential connection portion 6a and a radial connection portion 6b so as to cover one of void portions 7 provided at both ends of the magnet insertion hole 5.

Each circumferential connection portion 6a is a connection portion having a longitudinal direction that coincides with the circumferential direction of the core plate 1, and each radial connection portion 6b is a connection portion having a longitudinal direction that coincides with the radial direction of the core plate 1. Each void portion 7 is provided for increasing the magnetic resistance of a magnetic path connecting the inner peripheral side core portion 2 to the outer peripheral side core portion 3 in order to inhibit a magnetic short circuit at an end portion of the permanent magnet 9. The region between the inner peripheral side core portion 2 and the outer peripheral side core portion 3 is composed of the connection portions 6 and the void portions 7. Thus, the areas of the void portions 7 increase when the widths of the connection portions 6 are decreased.

Although described in detail later, a thin portion 12 is provided in a part, in the circumferential direction, of the circumferential connection portion 6a so as to be thinner than the other portion of the circumferential connection portion 6a. By providing the thin portion 12 in the circumferential connection portion 6a, the cross-sectional area of the circumferential connection portion 6a can be decreased thereby to increase the magnetic resistance, whereby a magnetic short circuit can be inhibited. In order to inhibit strength reduction due to the provision of the thin portion 12, an edge portion of the circumferential connection portion 6a at the center side of the core plate 1 has a shape that projects at the outer peripheral side of the core plate 1 with respect to a circular arc of a circle concentric with the core plate 1, and preferably has an elliptical arc shape. By providing the thin portion 12 so as to include a location where the width of the circumferential connection portion 6a is at its minimum, a location where stress concentration due to the shape in a thickness direction occurs is prevented from being the same as a location where stress concentration due to the shape in a surface direction occurs.

Here, the stress concentration means that stress equal to 1.2 times or more of average stress in the thin portion 12 occurs due to centrifugal force generated when the rotor 60 rotates. The average stress in the thin portion 12 can be obtained by dividing a load, in the circumferential direction, generated in the thin portion 12 when the rotor 60 rotates, by the cross-sectional area of a cross-section of the thin portion 12 orthogonal to the circumferential direction. In the present invention, a location where stress concentration occurs is referred to as stress concentration location.

Magnet stoppers 8 are provided in the inner peripheral side core portion 2 and at both end portions of the magnet insertion hole 5, whereby the permanent magnet 9 inserted in the magnet insertion hole 5 is inhibited from moving in the longitudinal direction of the magnet insertion hole 5 and is placed in position within the magnet insertion hole 5. The rotor core 20 is configured by stacking a plurality of the core plates 1 configured as described above such that the positions of the magnet insertion holes 5 coincide with each other.

Next, the configuration of the circumferential connection portion 6a and the thin portion 12 described above will be described in detail.

Figure 4:
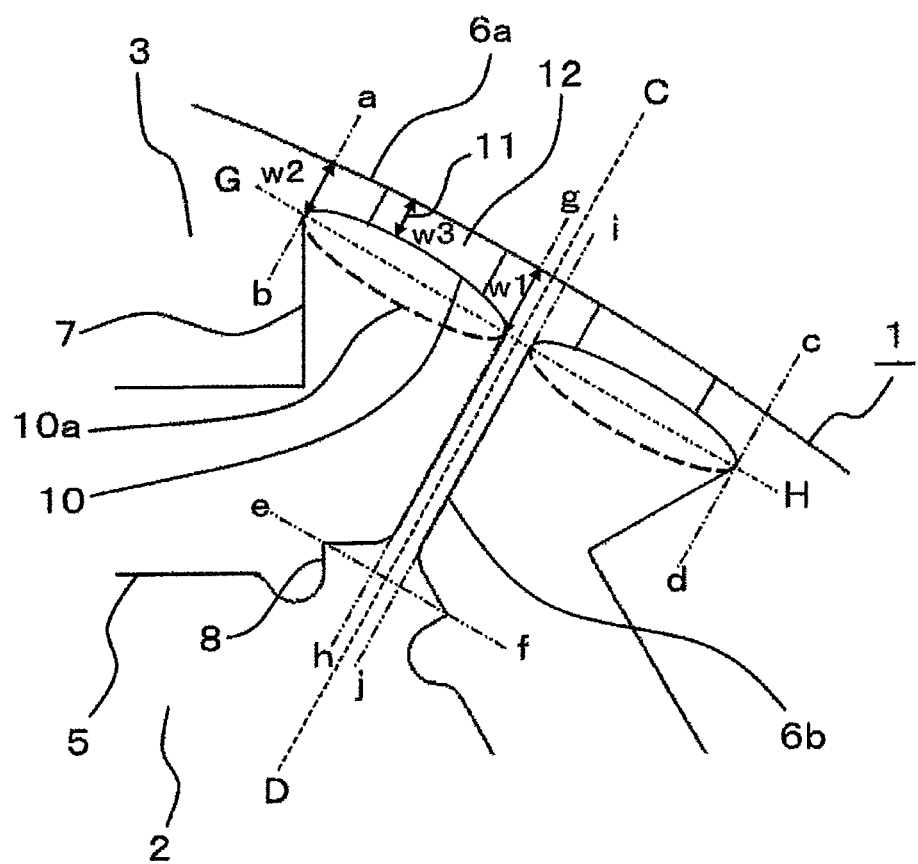
FIG. 4 is a partial plan view showing, in an enlarged manner, the configuration around a connection portion and void portions of the core plate in Embodiment 1 of the present invention.

FIG. 4 is a partial plan view showing, in an enlarged manner, the configuration around the connection portion and the void portions of the core plate shown in FIG. 2. FIG. 4 shows the configuration around the connection portion 6 and the void portions 7 of the core plate 1 shown in FIG. 2 at both sides of the dashed line C-D and at the upper side of the drawing sheet. As described above, the core plate 1 has a shape with rotational symmetry about the center thereof, and each magnetic pole has a shape with line symmetry about the polar axis. Thus, the configuration around the connection portion 6 and the void portions 7 shown here is not limited to the portion shown in FIG. 4 but also the configurations around all the connection portions 6 and the void portions 7 of the core plate 1 are the same.

In FIG. 4, alternate long and two short dashes lines a-b, c-d, and e-f are auxiliary lines for illustrating the range of the connection portion 6 in the core plate 1. The alternate long and two short dashes lines a-b and c-d are straight lines parallel to the dashed line C-D passing through the center of the core plate 1, and are tangent to the peripheries of the void portions 7 at locations where the distances from the dashed line C-D are the largest. The alternate long and two short dashes line e-f is a straight line perpendicular to the dashed line C-D passing through the center of the core plate 1, and is in contact with the edges of the magnet stoppers 8 at locations closest to the outer circumference of the core plate 1. In FIG. 4, when the alternate long and two short dashes lines a-b, c-d, and e-f are defined as boundary lines, the connection portion 6 is a region within these boundary lines. That is, in the core plate 1, the outer peripheral side core portion 3 and the connection portion 6 are demarcated by the alternate long and two short dashes lines a-b and c-d, and the inner peripheral side core portion 2 and the connection portion 6 are demarcated by the alternate long and two short dashes line e-f.

In addition, alternate long and two short dashes lines g-h and i-j are auxiliary lines for illustrating the boundary between the circumferential connection portion 6a and the radial connection portion 6b of the connection portion 6. The alternate long and two short dashes lines g-h and i-j are straight lines parallel to the dashed line C-D passing through the center of the core plate 1, and are in contact with the edges of the radial connection portion 6b. In FIG. 4, the width of the radial connection portion 6b is uniform, and thus the alternate long and two short dashes lines g-h and i-j are in contact with the entireties of the edges of the radial connection portion 6b. However, when the width of the radial connection portion 6b is not uniform, the alternate long and two short dashes lines g-h and i-j may be defined as straight lines tangent to the peripheries of the void portions 7 at locations closest to the outer circumference of the core plate 1. In the connection portion 6, the region between the alternate long and two short dashes lines g-h and i-j is the radial connection portion 6b, and the other region is the circumferential connection portion 6a.

Next, an alternate long and short dash line G-H and an ellipse 10a indicated by a long dashed line are auxiliary lines for illustrating the shape of the circumferential connection portion 6a. The alternate long and short dash line G-H is a straight line perpendicular to the dashed line C-D passing through the center of the core plate 1. As shown in FIG. 4, an inner edge portion 10 of the circumferential connection portion 6a has an elliptical arc shape. The ellipse 10a is an ellipse drawn such that the major axis thereof overlaps the alternate long and short dash line G-H, and the ellipse 10a is tangent to the alternate long and two short dashes lines a-b and g-h, which are parallel to the dashed line C-D extending in the longitudinal direction of the radial connection portion. That is, since the alternate long and two short dashes lines a-b and g-h are the boundary lines between the circumferential connection portion 6a and the other region as described above, the shape of the edge portion 10 of the circumferential connection portion 6a coincides with that of an elliptical arc of the ellipse 10a at the outer peripheral side of the core plate 1 with respect to the alternate long and short dash line G-H.

The range and the shape of the circumferential connection portion 6a are defined as described above. As shown in FIG. 4, the widths of both ends of the circumferential connection portion 6a are w1 and w2, respectively, and the edge portion 10 of the circumferential connection portion 6a at the center side of the core plate 1 has a shape that projects at the outer peripheral side of the core plate 1 with respect to the circle concentric with the core plate 1. Thus, a minimum width 11 at which the width is w3 and the smallest is provided in the circumferential connection portion 6a, and the width of the circumferential connection portion 6a smoothly decreases from both ends of the circumferential connection portion 6a toward the minimum width portion 11. The thin portion 12 is provided so as to include the minimum width portion 11.

In FIG. 4, since the major axis of the ellipse 10a overlaps the dashed line C-D, the minor axis of the ellipse 10a is not directed toward the center of the core plate 1, and the ellipse 10a is tilted at the side far from the dashed line C-D, toward the outer peripheral side of the core plate 1, and is tilted at the side near the dashed line C-D, toward the center side of the core plate 1. Thus, the minimum width portion 11 is provided farther from the dashed line C-D than the center of the ellipse 10a.

Figure 5:
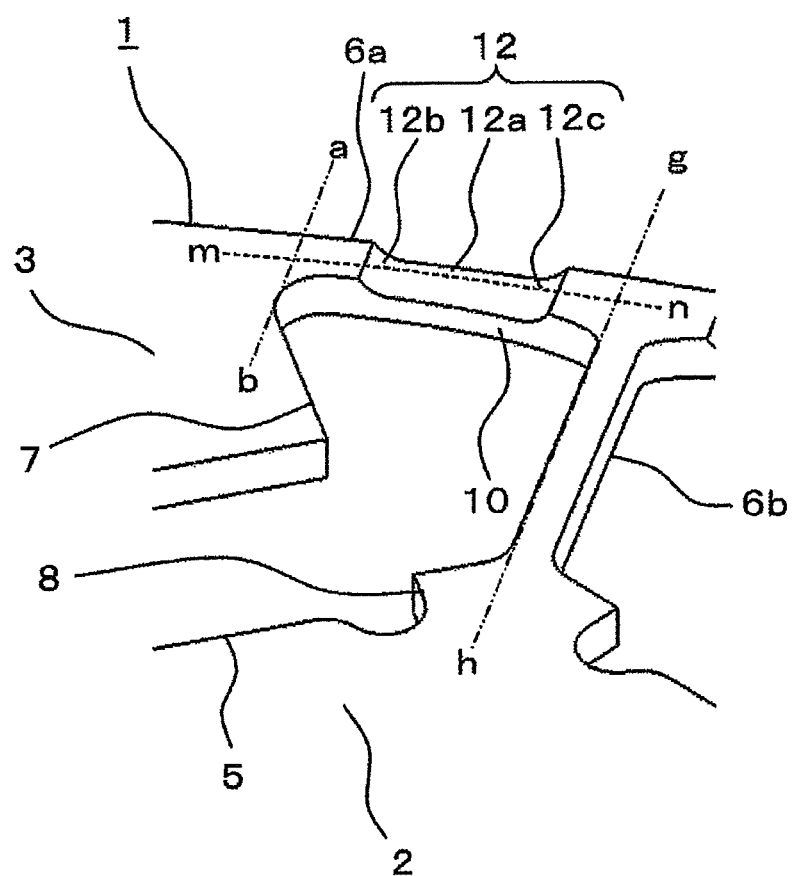
FIG. 5 is a partial perspective view showing, in an enlarged manner, the configuration around the connection portion and the void portions of the core plate in Embodiment 1 of the present invention.
Figure 6:
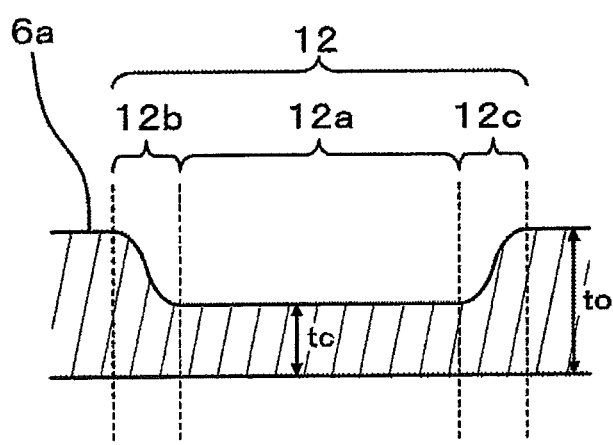
FIG. 6 is a cross-sectional view, in a thickness direction, of a circumferential connection portion of the core plate in Embodiment 1 of the present invention.

FIG. 5 is a partial perspective view showing, in an enlarged manner, the configuration around the connection portion and the void portions shown in FIG. 4. FIG. 6 is a cross-sectional view, in the thickness direction, of the circumferential connection portion taken along a dashed line m-n in FIG. 5.

As shown in FIGS. 5 and 6, the thickness of the thin portion 12 is smaller than that of the other portion of the core plate 1. The thin portion 12 may be formed by means of coining, which is pressing, or may be formed by means of cutting or etching. The thin portion 12 is preferably formed by means of coining, since the strength of the thin portion 12 can be made higher than that by cutting or etching, due to work hardening. By providing the thin portion 12 in the circumferential connection portion 6a as described above, the cross-sectional area of the thin portion 12 is decreased. Thus, the magnetic resistance of the thin portion 12 increases, and a leakage magnetic flux passing through the connection portion 6 is reduced, whereby the efficiency of the rotating electric machine can be improved. As shown in FIG. 5, the thin portion 12 is provided over the entirety, in the width direction, of the circumferential connection portion 6a. Meanwhile, the thin portion 12 may be provided in the entirety, in the longitudinal direction, of the circumferential connection portion 6a, or may be provided in a part, in the longitudinal direction, of the circumferential connection portion 6a. Furthermore, the thin portion 12 may be provided beyond the range of the circumferential connection portion 6a and in the outer peripheral side core portion 3 or the radial connection portion 6b. However, when the thin portion 12 is provided in a larger part, in the longitudinal direction, of the circumferential connection portion 6a, the magnetic resistance of the circumferential connection portion 6a further increases, so that the leakage magnetic flux can be reduced more.

As shown in FIG. 6, the thin portion 12 includes: a uniform thickness portion 12a that is a region having a uniform thickness tc; and non-uniform thickness portions 12b and 12c each having a thickness that changes from to to tc. The thickness to is the thickness of the core plate 1, and the thickness of the core plate 1 other than the thin portion 12 is to. As shown in FIG. 5, the non-uniform thickness portion 12b is located near the outer peripheral side core portion 3, and the non-uniform thickness portion 12c is located near the radial connection portion 6b. In order to increase the magnetic resistance of the circumferential connection portion 6a thereby to reduce the leakage magnetic flux, the ratio tc/to of the thickness tc of the uniform thickness portion 12a to the thickness to of the core plate 1 is preferably lower. In order to achieve both desired strength and leakage magnetic flux reduction, the ratio tc/to is preferably ¼ to ¾ and more preferably ⅓ to ⅔.

Each core plate 1 is configured as described above, and the rotor core 20 is configured by stacking a plurality of the core plates 1 such that the positions of the magnet insertion holes 5 coincide with each other. Since each core plate 1 has the thin portions 12, when the core plates 1 are stacked, air passages are formed at the thin portions 12 so as to provide communication between the void portions 7 and the outside of the rotor core 20. Thus, the permanent magnets 9 can be cooled by a fluid passing through the air passages.

Next, operation of the rotating electric machine according to Embodiment 1 of the present invention will be described. When a current is supplied to the stator of the rotating electric machine, the rotor 60 rotates about the rotation axis P-Q shown in FIG. 1. The rotation axis P-Q is an axis passing through the center of the core plate 1. When the rotor 60 rotates, centrifugal force acts on each permanent magnet 9 provided within the rotor core 20 and each outer peripheral side core portion 3 of each core plate 1. Since each core plate 1 is formed so as to have line symmetry about the polar axis R-S as described above, components in the circumferential direction perpendicular to the polar axis R-S, of the centrifugal force, are cancelled out, and only components in the radial direction parallel to the polar axis R-S act.

The force in the radial direction acting on each permanent magnet 9 and each outer peripheral side core portion 3 generates stress in each connection portion 6. The longitudinal direction of each radial connection portion 6b is directed in the radial direction, and only the components in the radial direction of the centrifugal force are present. Thus, only tensile stress occurs in the radial connection portion 6b. Meanwhile, since the longitudinal direction of each circumferential connection portion 6a is directed in the circumferential direction orthogonal to the radial direction, bending stress occurs in the circumferential connection portion 6a so as to bend the circumferential connection portion 6a toward the outer side of the core plate 1 with the vicinity of the boundary with the radial connection portion 6b as a fulcrum. Regarding the resistance of the core plate 1 to plastic deformation, the core plate 1 is strong for tensile stress but is weak for bending stress. Thus, the resistance to plastic deformation is determined by bending stress occurring in the circumferential connection portion 6a.

In the present invention, since the shape of the circumferential connection portion 6a is formed as described above, even when the thin portion 12 is provided in the circumferential connection portion 6a, the strength of the circumferential connection portion 6a can be made sufficiently high. The mechanism for this will be described below.

In the case where the thin portion 12 is provided in the circumferential connection portion 6a, locations where bending stress occurring in the circumferential connection portion 6a is concentrated can be considered separately as a stress concentration location due to the shape in the thickness direction and as a stress concentration location due to the shape in the surface direction of the core plate 1. In FIG. 6, the stress concentration due to the shape in the thickness direction occurs in the non-uniform thickness portion 12c of the thin portion 12 at the side near the radial connection portion 6b and in the vicinity of the boundary with the uniform thickness portion 12a. In other words, the stress concentration due to the shape in the thickness direction occurs in the thin portion 12, which is provided in the circumferential connection portion 6a, and at a location at which the thickness starts increasing from the minimum value and which is closest to the radial connection portion 6b.

Meanwhile, in FIG. 4, the stress concentration due to the shape in the surface direction of the core plate 1 occurs in the vicinity of the minimum width portion 11 of the thin portion 12 and at the side near the edge portion 10 of the circumferential connection portion 6a. The location of the stress concentration due to the shape in the surface direction cannot be more specifically indicated than that of the stress concentration due to the shape in the thickness direction, and, for example, the stress concentration due to the shape in the surface direction occurs at a position slightly shifted from the position of the minimum width portion 11, due to a factor such as the range where the thin portion 12 is provided. However, the stress concentration due to the shape in the surface direction generally occurs in the vicinity of the minimum width portion 11. Thus, by causing the boundary between the non-uniform thickness portion 12c, which is the stress concentration location due to the shape in the thickness direction, and the uniform thickness portion 12a to be away from the position of the minimum width portion 11, which is the stress concentration location due to the shape in the surface direction, the stress concentration due to the shape in the surface direction and the stress concentration due to the shape in the thickness direction can be spread, so that the maximum value of the bending stress occurring in the circumferential connection portion 6a can be reduced and the resistance to plastic deformation can be enhanced.

Next, the shape of an ellipse 10a that determines the shape of the elliptical arc of the edge portion 10 of the circumferential connection portion 6a, will be described.

Figure 7:
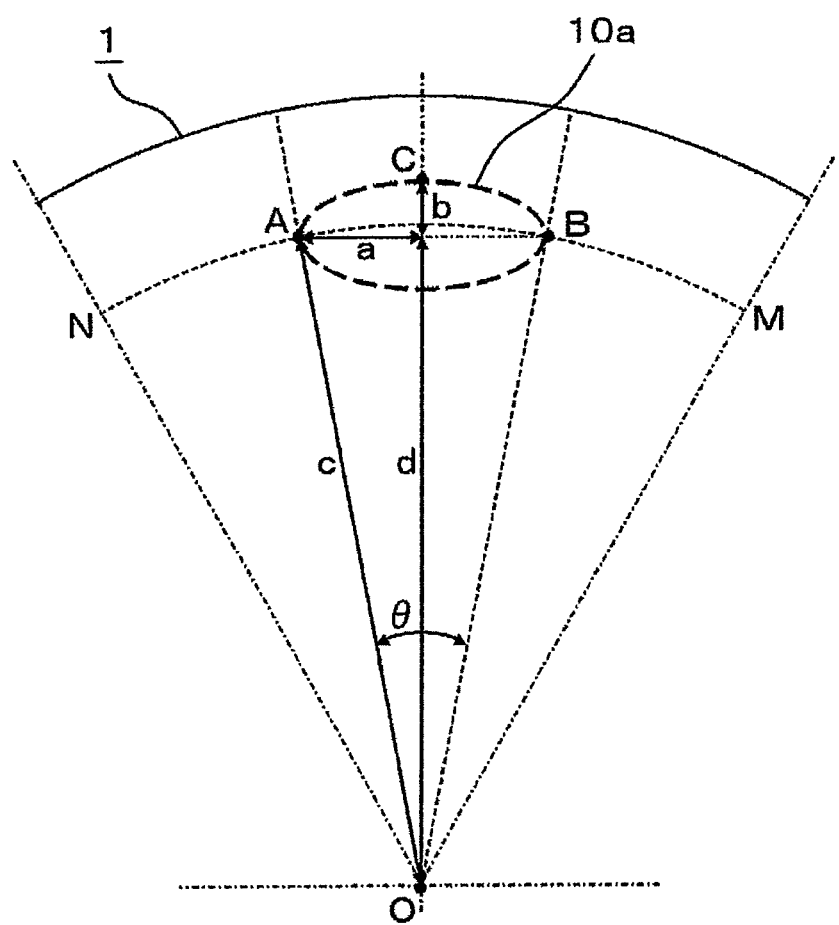
FIG. 7 is a plan view for defining the ellipse of an elliptical arc forming an edge portion of the circumferential connection portion of the core plate in Embodiment 1 of the present invention.

Generally, the shape of an ellipse can be defined by an ellipticity b/a when the semi-major axis thereof is denoted by a and the semi-minor axis thereof is denoted by b. FIG. 7 is a plan view for defining the ellipse of an elliptical arc that determines the edge portion of the circumferential connection portion. In FIG. 7, a circular arc indicated by a solid line represents the outer circumference of the core plate 1, and a point O represents the center of the core plate 1. In addition, an ellipse indicated by a dashed line is the ellipse 10a, which determines the shape of the elliptical arc of the edge portion 10 of the circumferential connection portion 6a. In FIG. 7, for easy understanding, the size of the ellipse 10a with respect to the size of the core plate 1 is shown so as to be larger than that in the actual core plate 1.

In FIG. 4, the minor axis of the ellipse 10a is directed in a direction deviating from the direction to the center of the core plate 1. However, in FIG. 7, the minor axis of the ellipse 10a is directed in the direction to the center of the core plate 1. In the actual core plate 1, the minor axis of the ellipse 10a does not need to be directed in the direction to the center of the core plate 1, and preferably deviates from the direction to the center of the core plate 1 as shown in FIG. 4, since the distance between the position of the minimum width portion 11 and the position of the boundary between the uniform thickness portion 12a and the non-uniform thickness portion 12c is increased and the stress concentration location due to the shape in the surface direction and the stress concentration location due to the shape in the thickness direction are farther from each other. However, as shown in FIGS. 2 and 4, the ratio of the size of the ellipse 10a to the size of the actual core plate 1 is lower than the ratio of the size of the ellipse 10a to the size of the core plate 1 shown in FIG. 7, and the difference between the direction of the minor axis and the direction to the center is slight. Thus, the shape of the ellipse 10a can be approximated to that in the case where the minor axis is directed in the direction to the center as in FIG. 7.

In FIG. 7, "a", "b", "c", and "d" represent the distances of respective line segments. "a" represents the semi-major axis of the ellipse 10a, and "b" represents the semi-minor axis of the ellipse 10a. In addition, a dashed line N-M passing through a point A and a point B on the major axis of the ellipse 10a represents a circular arc that forms apart of a circle concentric with the outer circumference of the core plate 1. "c" represents the distance between the point A on the major axis of the ellipse 10a and the center O of the core plate 1, and also represents the radius of the circle forming the circular arc composed of the dashed line N-M. "d" represents the distance between the center of the ellipse 10a and the center O of the core plate 1. Moreover, an angle θ is the angle between a line segment O-A connecting the center O of the core plate 1 to the point A and a line segment O-B connecting the center O of the core plate 1 to the point B.

The ellipse 10a is designed such that a point C on the minor axis thereof is located at the outer peripheral side of the core plate 1 with respect to the circular arc composed of the dashed line N-M. That is, a circular arc of the ellipse 10a passing through the point A, the point C, and the point B has a shape that projects at the outer peripheral side of the core plate 1 with respect to the dashed line N-M, which is the circular arc of the circle concentric with the core plate 1. When the point C on the minor axis is located at the outer peripheral side of the core plate 1 with respect to the circular arc composed of the dashed line N-M, a minimum width portion at which the distance between the ellipse 10a and the outer circumference of the core plate 1 is the smallest is located at the point C. However, when the point C on the minor axis is located at the center side of the core plate 1 with respect to the circular arc composed of the dashed line N-M, the minimum width portion is located at positions near the point A and the point B. As described above, the boundary between the uniform thickness portion 12a and the non-uniform thickness portion 12c of the thin portion 12 is present at the position near the point A or the point B, and a stress concentration portion due to the shape in the thickness direction is formed at the boundary. Thus, the minimum width portion is preferably located at the point C, in order to locate the stress concentration portion in the thickness direction and a stress concentration portion in the surface direction at different positions. Therefore, the ellipse 10a needs to be an ellipse in which the point C on the minor axis thereof is located at the outer peripheral side of the core plate 1 with respect to the circular arc composed of the dashed line N-M. Such an ellipse is defined by the distances a, b, c, and d and the angle θ shown in FIG. 7.

As shown in FIG. 7, in order for the point C on the minor axis to be located at the outer peripheral side of the core plate 1 with respect to the circular arc composed of the dashed line N-M, the total distance of the distance d and the minor axis b of the ellipse 10a needs to be larger than the radius of the circle forming the circular arc composed of the dashed line N-M, that is, the distance c. That is, it is necessary to satisfy the condition of the following mathematical expression (1).

$$b+d>c \quad (1)$$

The distance d is represented by $d=c \cdot \cos(\theta/2)$. Thus, when the distance d is substituted into the mathematical expression (1) and the mathematical expression (1) is transformed for the semi-minor axis b of the ellipse 10a, the following mathematical expression (2) is established.

$$b>c\{1-\cos(\theta/2)\} \quad (2)$$

The semi-major axis a of the ellipse 10a is represented by $a=c \cdot \sin(\theta/2)$. Thus, when the mathematical expression (2) is substituted into b/a, the ellipticity b/a is represented by the following mathematical expression (3).

$$b/a>\{1-\cos(\theta/2)\}/\sin(\theta/2) \quad (3)$$

As is seen from the direction of the inequality sign, the mathematical expression (3) represents the lower limit of the ellipticity of the ellipse 10a. As is seen from the mathematical expression (3), the lower limit of the ellipticity of the ellipse 10a is determined by the angle θ between two straight lines connecting the center O of the core plate 1 to the point A and the point B on the major axis of the ellipse 10a. Even when the direction of the minor axis of the ellipse 10a is tilted relative to the direction to the center of the core plate 1 as in FIG. 4, the lower limit of the ellipticity of the ellipse 10a may be similarly determined by the angle θ between the two straight lines connecting the center O of the core plate 1 to the point A and the point B on the major axis of the ellipse 10a.

Meanwhile, the upper limit thereof is examined by stress analysis. When the ellipticity b/a is ½, stress in the surface direction is excessively concentrated on the minimum width portion, and the maximum value of the stress increases. Thus, it is not preferred that the ellipticity b/a is ½. When the ellipticity b/a is ⅓, stress concentration in the surface direction also spreads to the vicinity of the minimum width portion. Thus, the stress in the surface direction is not excessively concentrated on the minimum width portion, and the maximum value of the stress is equal to or less than an allowable value. In addition, when the ellipticity b/a is ¼, the stress concentration portion in the surface direction further spreads to the vicinity of the minimum width portion, and a further desirable stress distribution is established. As described above, the ellipticity b/a of the ellipse 10a is preferably not greater than ⅓ and further preferably not greater than ¼.

In the mathematical expression (3), when the angle θ exceeds 36 degrees, the ellipticity b/a becomes equal to or greater than ⅓. When the angle θ exceeds 28 degrees, the ellipticity b/a becomes equal to or greater than ¼. Since the mathematical expression (3) is an expression representing the lower limit of the ellipticity b/a, the angle θ has to be not greater than 36 degrees when the upper limit of the ellipse 10a is set to ⅓, and the angle θ has to be not greater than 28 degrees when the upper limit is set to ¼.

Next, a result obtained by comparing a stress distribution of the above-described core plate 1 of Embodiment 1 of the present invention with a stress distribution of a conventional core plate in which a thin portion is formed in a circumferential connection portion of the core plate, by stress analysis, will be described. The conventional core plate has a shape in which the width of the circumferential connection portion is uniform in the longitudinal direction of the circumferential connection portion, and the inner edge portion of the circumferential connection portion and the periphery of the void portion are smoothly connected by a circular arc at both ends of the circumferential connection portion. That is, a circular arc forming the edge of the circumferential connection portion at the outer peripheral side of the core plate and a circular arc forming the edge of the circumferential connection portion at the center side of the core plate are formed by concentric circles each having a center that coincides with the center of the core plate. In the core plate 1 of Embodiment 1 of the present invention, as described above, the width of the circumferential connection portion 6a is different depending on the position, but the average width of the circumferential connection portion 6a of the core plate 1 of Embodiment 1 of the present invention is made equal to the width of the circumferential connection portion of the conventional core plate, in order to make the magnetic resistance of the circumferential connection portion 6a equal to that of the conventional core plate. The core plate 1 of the present invention has a shape in which the minor axis of the ellipse 10a is tilted relative to the direction to the center as shown in FIG. 4 and the ellipticity of the ellipse 10a is ¼. The thin portions of both core plates have the same thickness and the same length and are each provided in the radial connection portion at a position equidistant from the center axis. The thickness tc of the uniform thickness portion of the thin portion is set so as to be equal to ½ of the thickness to of the core plate.

An analysis model described above is created, and stress occurring when the rotor is rotated is obtained by analysis. Originally, a conventional core plate is not provided with the thin portion in the circumferential connection portion. However, hereinafter, a core plate obtained by providing a thin portion in the circumferential connection portion of the conventional core plate as described above is referred to as conventional core plate.

As a result of the stress analysis, in the conventional core plate, stress concentration due to the shape in the surface direction occurs in the vicinity of the boundary between the non-uniform thickness portion of the thin portion at the side near the radial connection portion and the uniform thickness portion, which vicinity is the same position as that of a stress concentration portion due to the shape in the thickness direction. The reason for this result is that the stress concentration due to the shape in the surface direction and the stress concentration due to the shape in the thickness direction occur at the same position, and great stress concentration occurs in the vicinity of the boundary between the non-uniform thickness portion of the thin portion at the side near the radial connection portion and the uniform thickness portion.

On the other hand, in the core plate 1 of the present invention, the stress concentration due to the shape in the surface direction occurs at a position different from the stress concentration portion due to the shape in the thickness direction, that is, in the vicinity of the minimum width portion 11 of the circumferential connection portion 6a. In addition, since the ellipticity is ¼, a stress distribution spreading from the position of the minimum width portion 11 is established. In addition, the stress concentration due to the shape in the thickness direction occurs in the vicinity of the boundary between the non-uniform thickness portion 12c of the thin portion 12 at the side near the radial connection portion 6b and the uniform thickness portion 12a. However, since the stress concentration due to the shape in the surface direction and the stress concentration due to the shape in the thickness direction occur at locations away from each other, the stress concentration is spread as a whole, and the maximum stress occurring in the circumferential connection portion 6a of the core plate 1 of the present invention is not greater than 70% of the maximum stress occurring in the circumferential connection portion of the conventional core plate.

As described above, regarding the core plate 1 of the present invention, the maximum stress occurring in the circumferential connection portion 6a can be made smaller than that in the conventional core plate. Thus, when the allowable value for the maximum stress is set so as to be equal to that for the conventional core plate, the width of the circumferential connection portion 6a can be further decreased, thereby increasing the magnetic resistance. Accordingly, an effect that a leakage magnetic flux due to a magnetic short circuit can be reduced thereby to improve the efficiency of the rotating electric machine, is achieved.

Regarding the core plate 1 of the present invention, when the width of the circumferential connection portion 6a is made equal to that of the conventional core plate in order to make the magnetic resistance equal to that of the conventional core plate, the maximum stress occurring in the circumferential connection portion 6a becomes smaller than that in the conventional core plate. Thus, an effect that each core plate can be formed from an electromagnetic steel sheet having lower cost and lower strength than those of the conventional core plate and thus the material cost of the rotating electric machine can be reduced, is achieved.

Regarding the core plate 1 of the present invention, when the rotor core 20 is configured by a plurality of the core plates 1, the thin portions 12 provided in the circumferential connection portions 6a of the core plates 1 form air passages providing communication between the void portions 7 within the rotor core 20 and the outer side of the rotor core 20. Thus, the permanent magnets the end portions of which are in contact with the void portions 7 can be cooled, so that an effect that the demagnetization resistance of the rotor 60 can be enhanced and torque can be increased without increasing the size of the rotor 60, is achieved.

Embodiment 2

Figure 8:
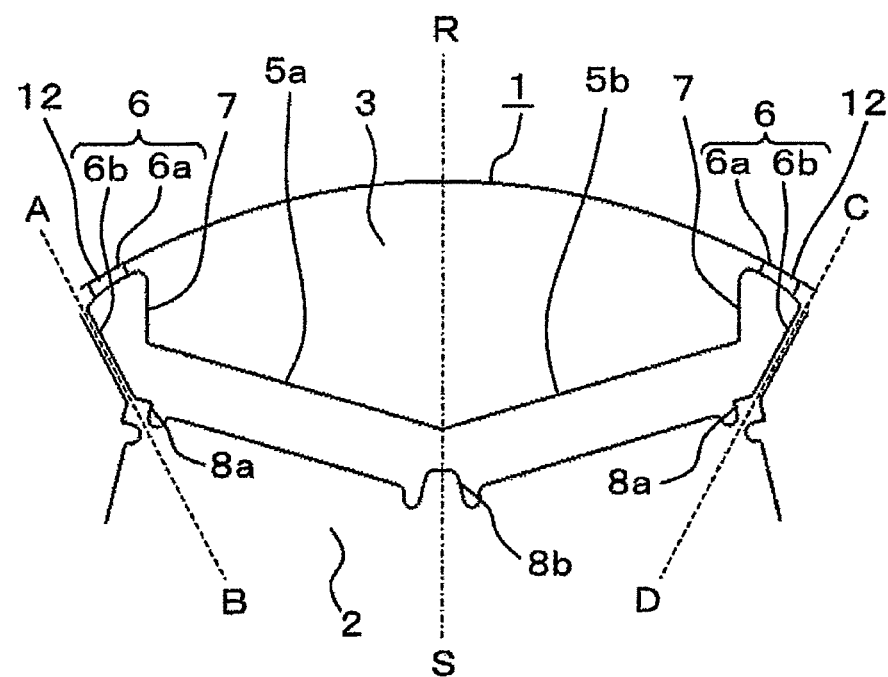
FIG. 8 is a partial plan view showing, in an enlarged manner, a part of a core plate forming a rotor core of a rotor for a rotating electric machine according to Embodiment 2 of the present invention.

FIG. 8 is a partial plan view showing, in an enlarged manner, a part of a core plate forming a rotor core of a rotor for a rotating electric machine of Embodiment 2 of the present invention. In FIG. 8, the components denoted by the same reference characters as in Embodiment 1 are the components that are the same as or correspond to those in Embodiment 1, and the description thereof is omitted. Embodiment 2 is different from Embodiment 1 of the present invention in the shape of each magnet insertion hole.

As shown in FIG. 8, in the core plate 1 of the rotor 60 of Embodiment 2, magnet insertion holes 5a and 5b are provided so as to be line symmetrical about a polar axis R-S and have a V shape that projects at the center side of the core plate 1. The magnet insertion holes 5a and 5b communicate with each other and are formed as one magnet insertion hole. End portions of the magnet insertion holes 5a and 5b at the side far from the polar axis R-S communicate with void portions 7, respectively, and connection portions 6 each including a circumferential connection portion 6a and a radial connection portion 6b are provided so as to surround the void portions 7. In addition, similarly to Embodiment 1, a thin portion 12 is provided in the circumferential connection portion 6a. A magnet stopper 8a is provided at each of the end portions of the magnet insertion holes 5a and 5b at the side far from the polar axis R-S, and magnet stoppers 8b are provided at the polar axis R-S side of the magnet insertion holes 5a and 5b.

A rotor core 20 is configured by stacking a plurality of the core plates 1 described above such that the positions of the magnet insertion holes 5a and 5b coincide with each other. A rotor 60 is configured by inserting plate-like permanent magnets into the magnet insertion holes 5a and the magnet insertion holes 5b of the rotor core 20, respectively. Movement of the permanent magnets in the longitudinal directions of the magnet insertion holes 5a and 5b is inhibited by the magnet stoppers 8a and 8b, and the permanent magnets are fixed within the rotor 20. Due to such a configuration, the volume of the inserted permanent magnets can be increased from that in the case of Embodiment 1. Thus, the maximum torque of the rotating electric machine can be increased without increasing the size of the rotor 60.

When the rotor 60 configured as described above rotates, centrifugal force acts on the permanent magnets and each outer peripheral side core portion 3 as described in Embodiment 1. The core plate 1 of Embodiment 2 is also configured to have line symmetry about the magnetic pole R-S as shown in FIG. 8, components in the circumferential direction, of the centrifugal force, are cancelled each other, and only components in the radial direction act. Therefore, tensile stress occurs in each radial connection portion 6b, and bending stress occurs in each circumferential connection portion 6a.

In the case of the core plate 1 of Embodiment 2 as well, as described in Embodiment 1, by forming the thin portion 12 in the circumferential connection portion 6a by means of coining or the like and making the inner edge portion 10 of the circumferential connection portion 6a into an elliptical arc, stress concentration due to the shape in the thickness direction and stress concentration due to the shape in the surface direction can occur at different locations, and the stress distribution of the circumferential connection portion 6a can be spread. Therefore, the resistance of the core plate 1 to plastic deformation can be enhanced while the magnetic resistance of the connection portion 6 is increased by the thin portion 12 thereby to reduce a leakage magnetic flux due to a magnetic short circuit to improve the efficiency of the rotating electric machine.

In FIG. 8, the magnet insertion holes 5a and 5b communicate with each other and are formed as one magnet insertion hole. However, a connection portion may be additionally provided between the magnet insertion holes 5a and 5b, and the magnet insertion holes 5a and 5b may be formed so as to be fully separated from each other. When a connection portion is additionally provided between the magnet insertion holes 5a and 5b, a magnetic short circuit occurs due to the additional connection portion. Thus, in order to improve the efficiency of the rotating electric machine, preferably, a connection portion is not additionally provided between the magnet insertion holes 5a and 5b, and the magnet insertion holes 5a and 5b communicate with each other and are formed as one magnet insertion hole as in FIG. 8. However, even when a connection portion is additionally provided between the magnet insertion holes 5a and 5b, the resistance of the core plate 1 to plastic deformation can be enhanced by forming the thin portion 12 in the circumferential connection portion 6a and making the inner edge portion 10 of the circumferential connection portion 6a into an elliptical arc.

Embodiment 3

Figure 9:
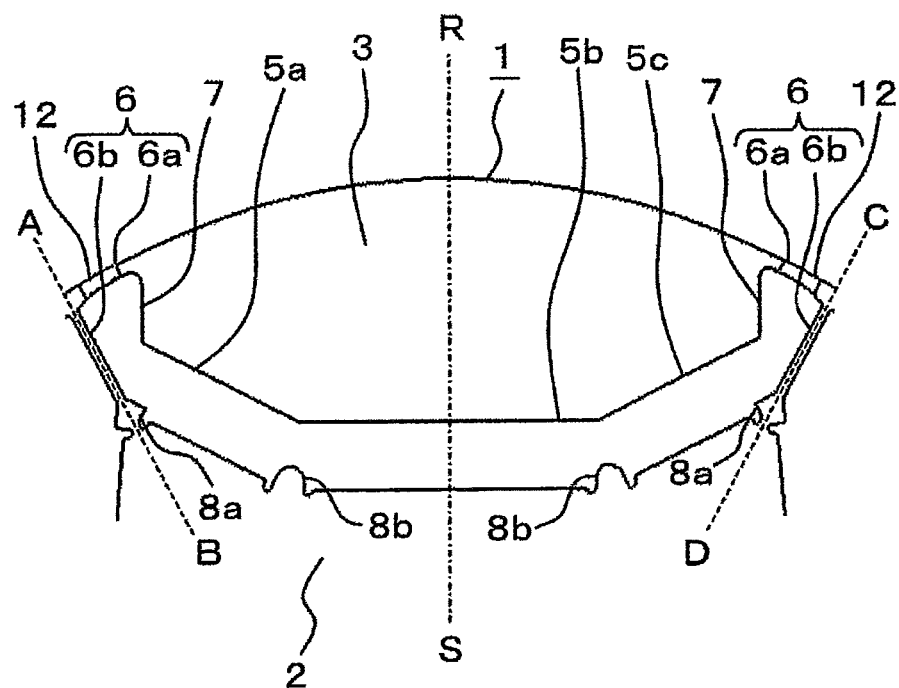
FIG. 9 is a partial plan view showing, in an enlarged manner, a part of a core plate forming a rotor core of a rotor for a rotating electric machine according to Embodiment 3 of the present invention.

FIG. 9 is a partial plan view showing, in an enlarged manner, a part of a core plate forming a rotor core of a rotor for a rotating electric machine of Embodiment 3 of the present invention. In FIG. 9, the components denoted by the same reference characters as in Embodiment 1 are the components that are the same as or correspond to those in Embodiment 1, and the description thereof is omitted. Embodiment 2 is different from Embodiment 1 of the present invention in the shape of each magnet insertion hole.

As shown in FIG. 9, in the core plate 1 of the rotor 60 of Embodiment 3, magnet insertion holes 5a, 5b, and 5c are provided so as to be line symmetrical about a polar axis R-S and have a U shape that projects at the center side of the core plate 1. The magnet insertion holes 5a, 5b, and 5c communicate with each other and are formed as one magnet insertion hole. End portions of the magnet insertion holes 5a and 5c at the side far from the polar axis R-S communicate with void portions 7, respectively, and connection portions 6 each including a circumferential connection portion 6a and a radial connection portion 6b are provided so as to surround the void portions 7. In addition, similarly to Embodiment 1, a thin portion 12 is provided in the circumferential connection portion 6a. A magnet stopper 8a is provided at each of the end portions of the magnet insertion holes 5a and 5c at the side far from the polar axis R-S, and magnet stoppers 8b are provided between both end portions of the magnet insertion hole 5b and end portions of the magnet insertion holes 5a and 5c at the side near the polar axis R-S.

A rotor core 20 is configured by stacking a plurality of the core plates 1 described above such that the positions of the magnet insertion holes 5a, 5b, and 5c coincide with each other. A rotor 60 is configured by inserting plate-like permanent magnets into the magnet insertion holes 5a, the magnet insertion holes 5b, and the magnet insertion holes 5c of the rotor core 20, respectively. Movement of the permanent magnets in the longitudinal directions of the magnet insertion holes 5a, 5b, and 5c is inhibited by the magnet stoppers 8a and 8b, and the permanent magnets are fixed within the rotor 20. Due to such a configuration, the volume of the inserted permanent magnets can be further increased from that in the case of Embodiment 2. Thus, the maximum torque of the rotating electric machine can be further increased without increasing the size of the rotor 60.

When the rotor 60 configured as described above rotates, centrifugal force acts on the permanent magnets and each outer peripheral side core portion 3 as described in Embodiment 1. The core plate 1 of Embodiment 3 is also configured to have line symmetry about the magnetic pole R-S as shown in FIG. 9, components in the circumferential direction, of the centrifugal force, are cancelled each other, and only components in the radial direction act. Therefore, tensile stress occurs in each radial connection portion 6b, and bending stress occurs in each circumferential connection portion 6a.

In the case of the core plate 1 of Embodiment 3 as well, as described in Embodiment 1, by forming the thin portion 12 in the circumferential connection portion 6a by means of coining or the like and making the inner edge portion 10 of the circumferential connection portion 6a into an elliptical arc, stress concentration due to the shape in the thickness direction and stress concentration due to the shape in the surface direction can occur at different locations, and the stress distribution of the circumferential connection portion 6a can be spread. Therefore, the resistance of the core plate 1 to plastic deformation can be enhanced while the magnetic resistance of the connection portion 6 is increased by the thin portion 12 thereby to reduce a leakage magnetic flux due to a magnetic short circuit to improve the efficiency of the rotating electric machine.

In FIG. 9, the magnet insertion holes 5a, 5b, and 5c communicate with each other and are formed as one magnet insertion hole. However, connection portions may be additionally provided between the respective magnet insertion holes, and the respective magnet insertion holes may be formed so as to be separated from each other, as described in Embodiment 2.

Embodiment 4

Figure 10:
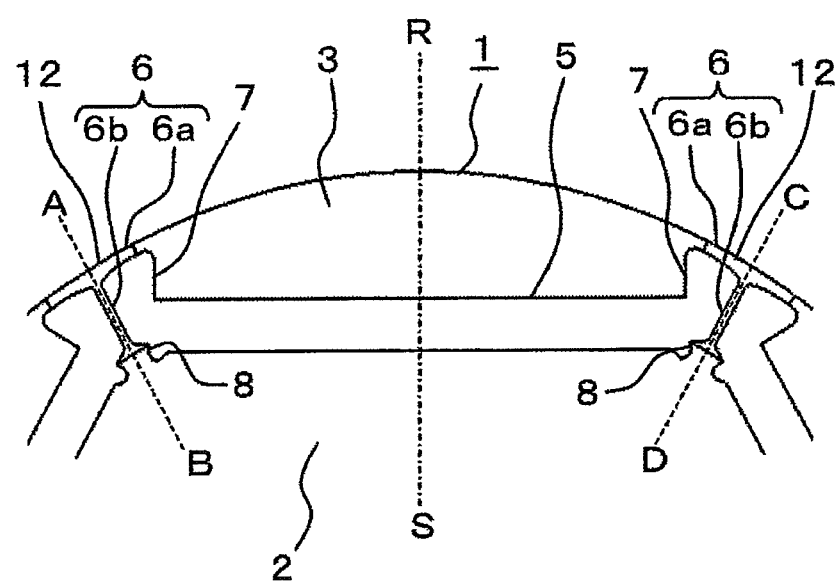
FIG. 10 is a partial plan view showing, in an enlarged manner, a part of a core plate forming a rotor core of a rotor for a rotating electric machine according to Embodiment 4 of the present invention.
Figure 11:
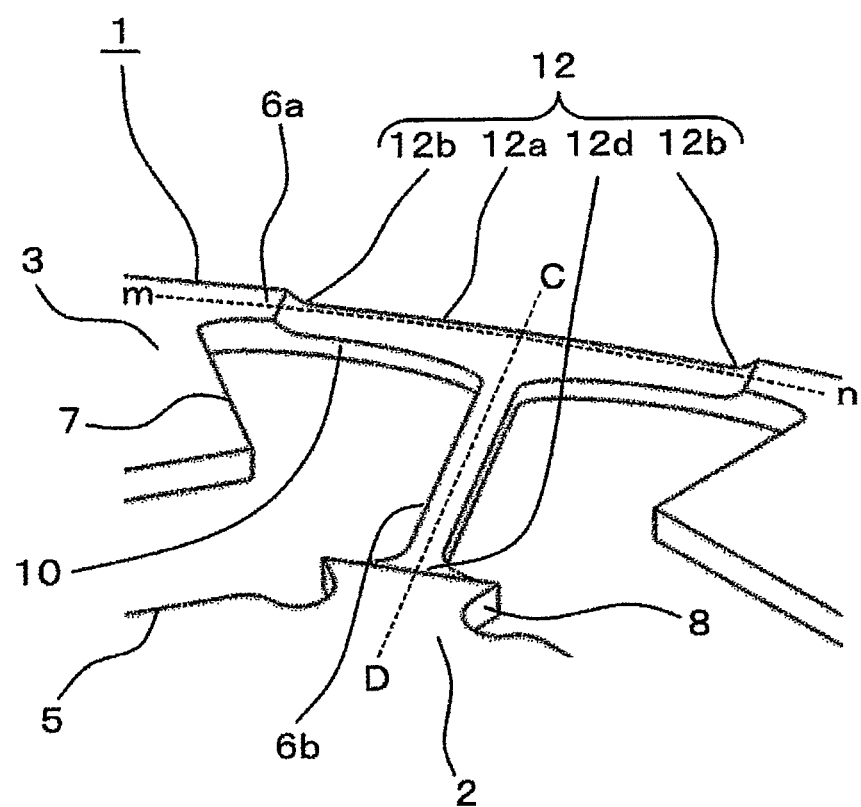
FIG. 11 is a partial perspective view showing, in an enlarged manner, the configuration around a connection portion and void portions of the core plate in Embodiment 4 of the present invention.

FIG. 10 is a partial plan view showing, in an enlarged manner, a part of a core plate forming a rotor core of a rotor for a rotating electric machine of Embodiment 4 of the present invention. FIG. 11 is a partial perspective view showing, in an enlarged manner, the configuration around a connection portion and void portions of the core plate shown in FIG. 10. In FIGS. 10 and 11, the components denoted by the same reference characters as in Embodiment 1 are the components that are the same as or correspond to those in Embodiment 1, and the description thereof is omitted. Embodiment 4 is different from Embodiment 1 of the present invention in the configuration of a thin portion provided in each connection portion.

Figure 12A:
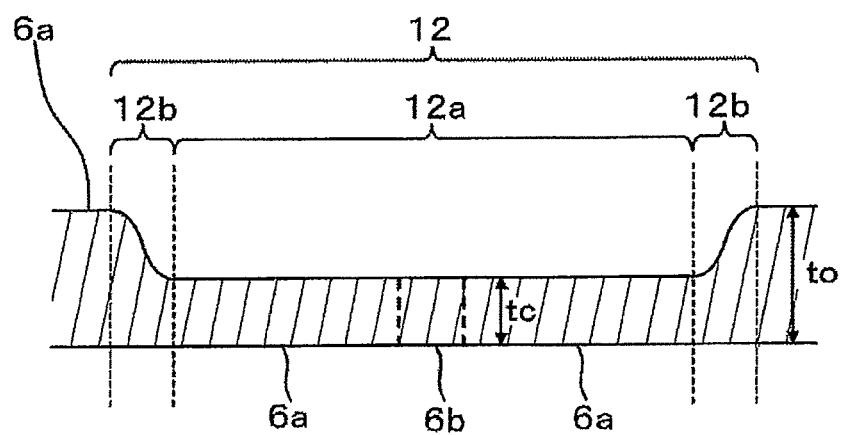
FIG. 12A shows a cross-sectional view, in a thickness direction, of the connection portion of the core plate in Embodiment 4 of the present invention.
Figure 12B:
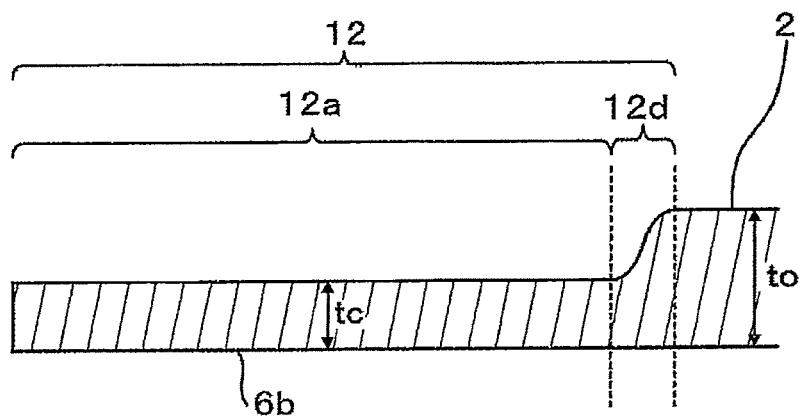
FIG. 12B shows a cross-sectional view, in a thickness direction, of the connection portion of the core plate in Embodiment 4 of the present invention.

As shown in FIG. 11, in the core plate 1 of Embodiment 4, a thin portion 12 is continuously provided in both a circumferential connection portion 6a and a radial connection portion 6b. FIG. 12 shows cross-sectional views in the thickness direction taken along a dashed line m-n and a dashed line C-D in FIG. 11. FIG. 12A is the cross-sectional view taken along the dashed line m-n, and the left side of the drawing sheet is the m-side of the dashed line m-n. FIG. 12B is the cross-sectional view taken along the dashed line C-D, and the left side of the drawing sheet is the C-side of the dashed line C-D, that is, the outer peripheral side of the core plate 1. As shown in FIGS. 11 and 12, the thin portion 12 includes: a uniform thickness portion 12a that is continuously provided in both the circumferential connection portion 6a and the radial connection portion 6b and has a uniform thickness tc; and non-uniform thickness portions 12b and 12d that are provided at the periphery of the uniform thickness portion 12a and each have a thickness that changes from tc to to. Similarly to the non-uniform thickness portion 12b described in Embodiment 1, each non-uniform thickness portion 12b is a non-uniform thickness portion provided in the circumferential connection portion 6a. Meanwhile, in Embodiment 4, no non-uniform thickness portion is present at the side of the circumferential connection portion 6a near the radial connection portion 6b, and, unlike Embodiment 1, the non-uniform thickness portion 12d is present at a portion where the radial connection portion 6b and the inner peripheral side core portion 2 are connected to each other. The inner edge portion 10 of the circumferential connection portion 6a has an elliptical arc shape similarly to that shown in Embodiment 1.

A rotor core 20 is configured by stacking a plurality of the core plates 1 configured as described above such that the positions of the magnet insertion holes 5 coincide with each other, and a rotor 60 is configured by inserting plate-like permanent magnets into the magnet insertion holes of the rotor core 20. When the rotor 60 rotates, centrifugal force acts on the permanent magnets and each outer peripheral side core portions 3. However, since the core plate 1 is configured to have line symmetry about the polar axis R-S as described in Embodiments 1 to 3, components in the circumferential direction are cancelled, and only components in the radial direction act.

In the core plate 1 of Embodiment 4, the non-uniform thickness portions 12c that are present in the core plates of Embodiments 1 to 3 and provided at the side of the circumferential connection portion 6a near the radial connection portion 6b are not present. Thus, a concentration portion of bending stress due to the shape in the thickness direction occurs in the non-uniform thickness portion 12b at the side of the circumferential connection portion 6a near the outer peripheral side core portion 3. Meanwhile, only tensile stress acts on the non-uniform thickness portion 12d, which is provided at the portion where the radial connection portion 6b and the inner peripheral side core portion 2 are connected to each other. Thus, in terms of the resistance to plastic deformation, stress occurring in the non-uniform thickness portion 12d does not become a problem as compared to that in the non-uniform thickness portion 12b. The distance from the radial connection portion 6b to the position of the non-uniform thickness portion 12b is larger than that to the non-uniform thickness portion 12c shown in Embodiment 1. Thus, the maximum value of stress occurring in the non-uniform thickness portion 12b is smaller than the maximum value of stress occurring in the non-uniform thickness portion 12c shown in Embodiment 1.

Meanwhile, the elliptical arc of the inner edge portion 10 of the circumferential connection portion 6a is formed so as to overlap the ellipse 10a described in Embodiment 1. Thus, similarly to Embodiment 1, stress concentration due to the shape in the surface direction occurs in the vicinity of a minimum width portion 11 at which the width of the circumferential connection portion 6a is the narrowest. Therefore, since stress concentration due to the shape in the thickness direction and stress concentration due to the shape in the surface direction occur at different locations, the stress distribution of the circumferential connection portion 6a can be spread. As a result, the resistance of the core plate 1 to plastic deformation can be enhanced while the magnetic resistance of the connection portion 6 is increased by the thin portion 12 thereby to reduce a leakage magnetic flux due to a magnetic short circuit to improve the efficiency of the rotating electric machine.

In Embodiments 1 to 4 described above, the case where the shape of the inner edge portion 10 of the circumferential connection portion 6a is an elliptical arc has been described. However, when a minimum width portion at which the width of the circumferential connection portion 6a is not uniform and is the narrowest is provided at a position different from the vicinity of the boundary between the uniform thickness portion and the non-uniform thickness portion of the thin portion, the inner edge portion 10 of the circumferential connection portion 6a may have, instead of the elliptical arc, a shape in which two or more circular arcs having different diameters, two or more elliptical arcs of which both or either of the major axes and the minor axes are different from each other, or two or more circular arcs and elliptical arcs are smoothly connected to each other.

The case where the core plate 1 has line symmetry about the polar axis has also been described. However, the stress occurring in each connection portion 6 when the rotor core 20 rotates is due to centrifugal force generated in each outer peripheral side core portion 3 and each permanent magnet 9. Thus, due to provision of holes for inserting the rivets 24 in the inner peripheral side core portion 2, or the like, the inner peripheral side core portion 2 may not have line symmetry, and, to be exact, the core plate 1 may not have line symmetry about the polar axis.

The case where the core plate 1 has a circular outer periphery has also been described. However, the outer periphery of the core plate 1 is not limited to the circular shape, and even when the outer periphery of the core plate 1 has a shape having projections and recesses such as a flower leaf shape, the same advantageous effects are achieved. In addition, by using high-strength electromagnetic steel sheets having a tensile strength of not less than 700 MPa for the core plate 1, sufficient strength can be ensured even when the widths of the circumferential connection portion 6a and the radial connection portion 6b are decreased, and a rotor in which a leakage magnetic flux due to a magnetic short circuit is reduced, is obtained. Thus, a rotating electric machine having good efficiency can be obtained.

Embodiment 5

Figure 13:
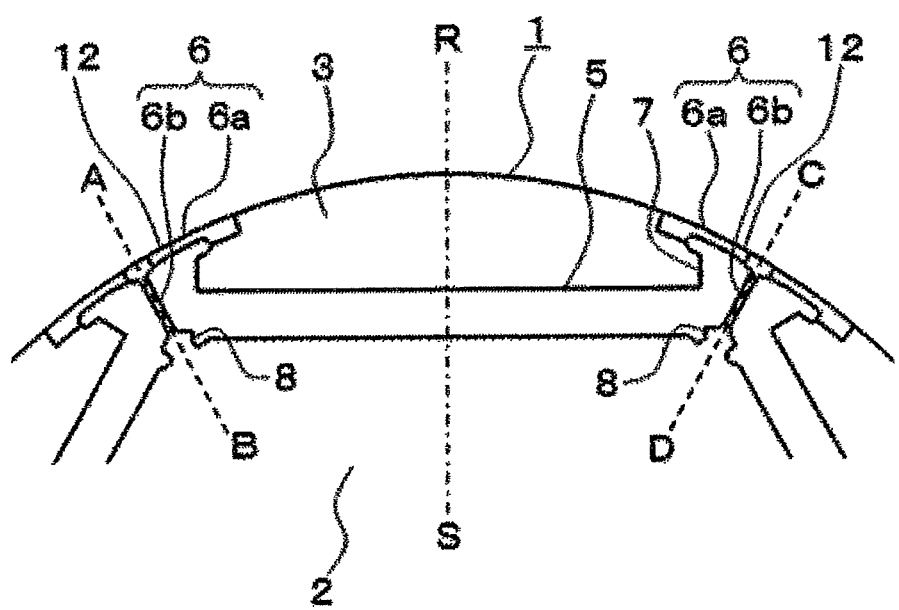
FIG. 13 is a partial plan view showing, in an enlarged manner, a part of a core plate forming a rotor core of a rotor for a rotating electric machine according to Embodiment 5 of the present invention.
Figure 14:
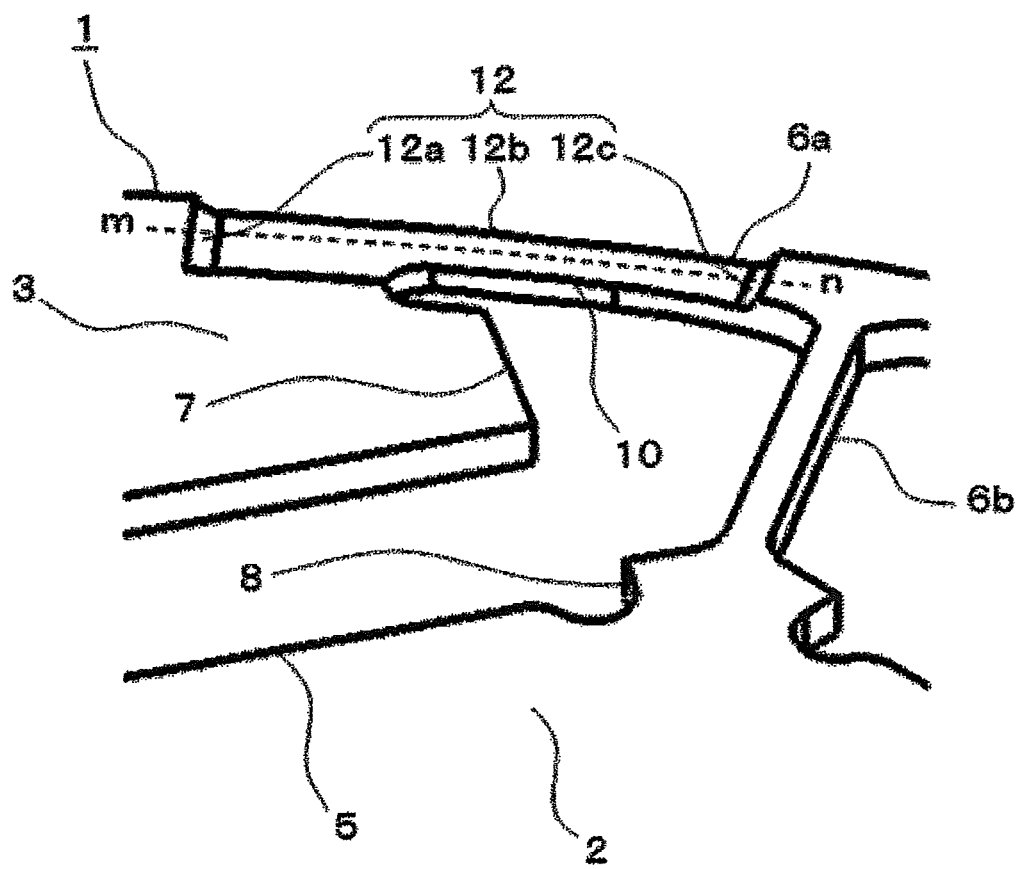
FIG. 14 is a partial perspective view showing, in an enlarged manner, the configuration around a connection portion and void portions of the core plate in Embodiment 5 of the present invention.

FIG. 13 is a partial plan view showing, in an enlarged manner, a part of a core plate forming a rotor core of a rotor for a rotating electric machine of Embodiment 5 of the present invention. FIG. 14 is a partial perspective view showing, in an enlarged manner, the configuration around a connection portion and void portions of the core plate shown in FIG. 13. In FIGS. 13 and 14, the components denoted by the same reference characters as in Embodiment 1 are the components that are the same as or correspond to those in Embodiment 1, and the description thereof is omitted. Embodiment 5 is different from Embodiment 1 of the present invention in the configuration of a thin portion provided in each connection portion and the shape of the edge portion of each circumferential connection portion.

Figure 15:
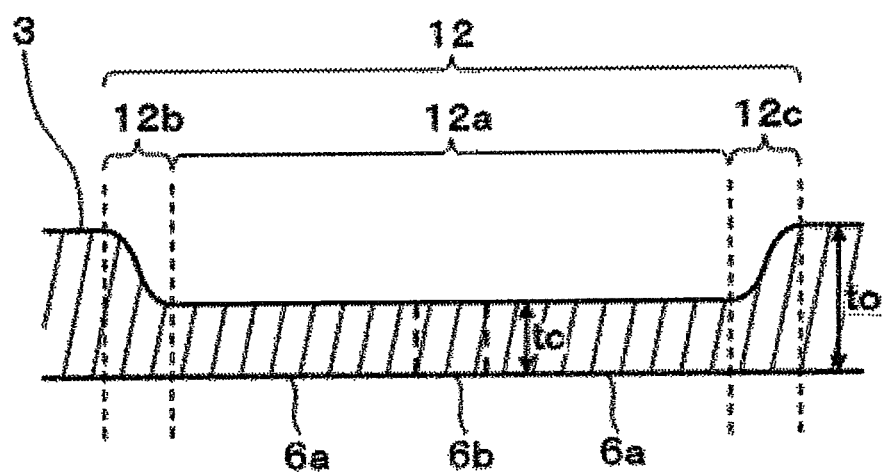
FIG. 15 is a cross-sectional view in a thickness direction around a circumferential connection portion of the core plate in Embodiment 5 of the present invention.

As shown in FIGS. 13 and 14, in the core plate 1 of Embodiment 5, a thin portion 12 is provided in a circumferential connection portion 6a and an outer peripheral side core portion 3. FIG. 15 is a cross-sectional view in the thickness direction taken along a dashed line m-n in FIG. 14. In FIG. 15, the left side of the drawing sheet is the m-side of the dashed line m-n. As shown in FIGS. 14 and 15, the thin portion 12 includes: a uniform thickness portion 12a that is provided in the circumferential connection portion 6a and the outer peripheral side core portion 3 and has a uniform thickness tc; and non-uniform thickness portions 12b and 12c that are provided at the periphery of the uniform thickness portion 12a and each have a thickness that changes from tc to to. Unlike the non-uniform thickness portion 12b described in Embodiment 1, the non-uniform thickness portion 12b is entirely provided within the outer peripheral side core portion 3, not within the circumferential connection portion 6a. Meanwhile, similarly to the non-uniform thickness portion 12c described in Embodiment 1, the non-uniform thickness portion 12c is provided at the side of the circumferential connection portion 6a near the radial connection portion 6b.

Figure 16:
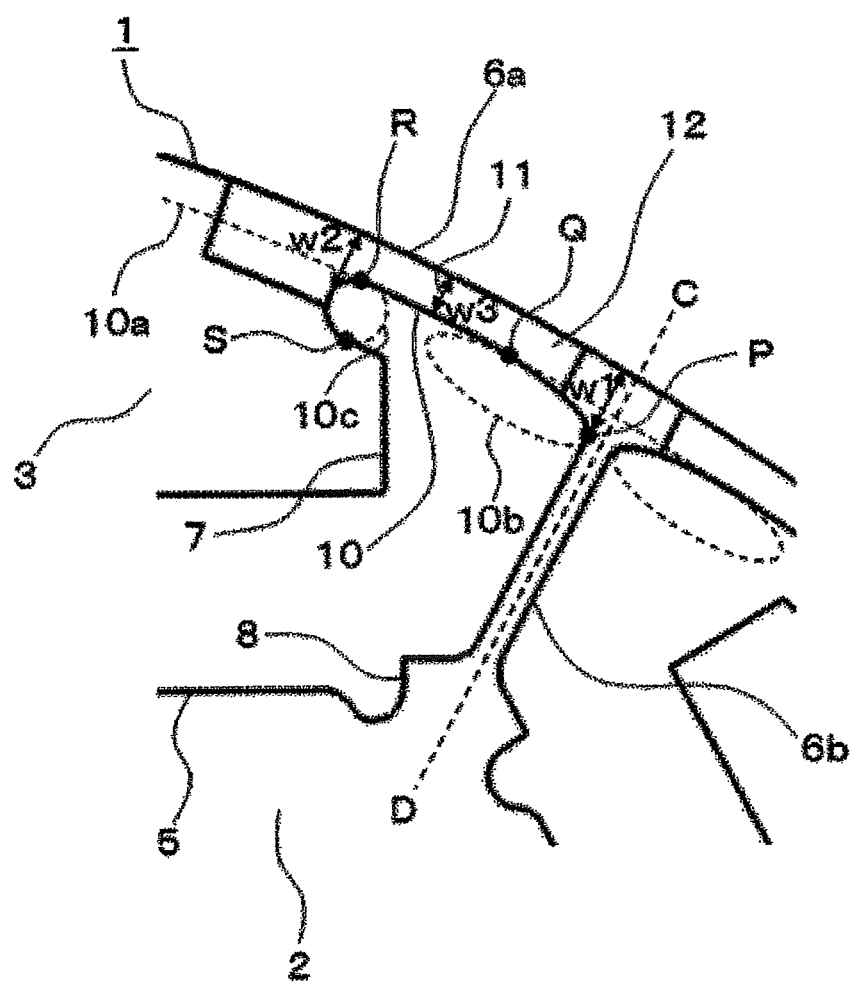
FIG. 16 is a partial plan view showing the configuration around the connection portion and the void portions of the core plate in Embodiment 5 of the present invention.

FIG. 16 is a partial plan view showing the configuration around the connection portion and the void portions of the core plate shown in FIG. 13. In FIG. 16, a circular arc 10a, an ellipse 10b, and a circle 10c indicated by dashed lines, a point P, a point Q, a point R, and a point S are auxiliary lines and auxiliary points for illustrating the shape of an inner edge portion 10 of the circumferential connection portion 6a. The circular arc 10a is concentric with the core plate 1 formed in a circular shape, that is, a circular arc having a center on the rotation axis of the core plate 1. The ellipse 10b is an ellipse having a semi-major axis and a semi-minor axis that are shorter than the radius of the circular arc 10a, and the major axis thereof is orthogonal to a dashed line C-D passing through the center of the core plate 1. The circle 10c is a circle having a radius smaller than that of the circular arc 10a.

The ellipse 10b is tangent to the radial connection portion 6b at the point P, an elliptical arc PQ of the ellipse 10b forms a part of the rotation axis-side edge portion 10 of the circumferential connection portion 6a. The circle 10c is tangent to the outer peripheral side core portion 3 at the point S, and a circular arc RS of the circle 10c forms a part of the edge portion 10. The circular arc 10a has a first end portion at the position of the point Q, and a second end portion at the position of the point R, and a circular arc QR forms a part of the edge portion 10. The elliptical arc PQ is connected to the first end portion of the circular arc QR, and the circular arc RS is connected to the second end portion of the circular arc QR. The edge portion 10 is formed such that the elliptical arc PQ, the circular arc QR, the circular arc RS, the circumferential connection portion 6a, and the outer peripheral side core portion 3 are smoothly connected to each other at the point P, the point Q, the point R, and the point S and the curvature of radius does not rapidly change. That is, the inner edge portion 10 of the circumferential connection portion 6a has a shape including the elliptical arc PQ, the circular arc QR, and the circular arc RS.

Of the thin portion 12 of the circumferential connection portion 6a, the non-uniform thickness portion 12c at the radial connection portion 6b side is formed at a position including the elliptical arc PQ. In addition, a minimum width portion 11 is provided in a region along the circular arc QR. That is, in the core plate 1 of Embodiment 5, unlike the core plates described in Embodiments 1 to 4, the minimum width portion 11 provided in the circumferential connection portion 6a is not a point but a region having a length in the longitudinal direction of the circumferential connection portion 6a. Even in this case, the stress concentration location in the surface direction in the circumferential connection portion 6a is not over the entirety of the minimum width portion 11 and is a point within the minimum width portion 11. However, since the minimum width portion 11 is provided in the region along the circular arc QR, the magnetic resistance of the circumferential connection portion 6a can be further increased thereby to reduce a leakage magnetic flux. In the case with the shape shown in FIG. 16, the stress concentration location in the surface direction is generally within the minimum width portion 11 along the circular arc QR and is close to a location where the circular arc QR and the elliptical arc PQ are connected to each other.

A rotor core 20 is configured by stacking a plurality of the core plates 1 configured as described above such that the positions of magnet insertion holes 5 coincide with each other, and a rotor 60 is configured by inserting plate-like permanent magnets into the magnet insertion holes of the rotor core 20. When the rotor 60 rotates, centrifugal force acts on the permanent magnets and each outer peripheral side core portions 3. However, since the core plate 1 is configured to have line symmetry about the polar axis R-S as described in Embodiments 1 to 4, components in the circumferential direction are cancelled, and only components in the radial direction act.

In the core plate 1, the thin portion 12 is formed in the circumferential connection portion 6a by means of coining or the like, the non-uniform thickness portion 12b of the thin portion 12 is provided within the outer peripheral side core portion 3, the non-uniform thickness portion 12c of the thin portion 12 is provided at the position including the elliptical arc PQ, and the minimum width portion 11 is provided in the region along the circular arc QR. Thus, since the minimum width portion 11, which is the stress concentration location of the surface direction, and the non-uniform thickness portions 12b and 12c, which are the stress concentration location in the thickness direction, are located at different positions, the resistance of the core plate 1 to plastic deformation can be enhanced similarly to the core plates of Embodiments 1 to 4.

In the core plate 1 of Embodiment 5, the minimum width portion 11 is provided over the entirety of the region along the circular arc QR that is concentric with the circle of the outer shape of the core plate 1. Thus, the cross-sectional area of the circumferential connection portion 6a can be made smaller over a long distance than those of the core plates shown in Embodiments 1 to 4. Therefore, the magnetic resistance of the circumferential connection portion 6a can be increased thereby to reduce a leakage magnetic flux. Moreover, since the thin portion 12 is provided in the circumferential connection portion 6a and the outer peripheral side core portion 3, the range of the thin portion 12 is wider than that in Embodiment 1. Accordingly, the resistance of the core plate 1 to plastic deformation can be enhanced while the magnetic resistance of the connection portion 6 is increased, as compared to that of the core plate of Embodiment 1, thereby to further reduce a leakage magnetic flux due to a magnetic short circuit to improve the efficiency of the rotating electric machine.

In Embodiment 5, the shape of the rotation axis-side edge portion 10 of the circumferential connection portion 6a is a shape including the circular arc QR concentric with the outer shape of the core plate 1 and the elliptical arc PQ and the circular arc RS smoothly connected to both ends of the circular arc QR, but may be a shape formed by smoothly connecting circular arcs to both ends of the circular arc QR, or a shape formed by smoothly connecting elliptical arcs to both ends of the circular arc QR. In addition, as shown in FIG. 16, the shape formed by smoothly connecting the elliptical arc to the radial connection portion 6b side of the circular arc QR and the circular arc to the outer peripheral side core portion 3 side of the circular arc QR is most preferable from the viewpoint of separating the stress concentration location in the thickness direction from the stress concentration location in the surface direction. However, the shape of the rotation axis-side edge portion 10 may be a shape formed by smoothly connecting a circular arc to the radial connection portion 6b side of the circular arc QR and an elliptical arc to the outer peripheral side core portion 3 side of the circular arc QR. Moreover, the shape of the rotation axis-side edge portion 10 may be a shape obtained by further smoothly connecting another circular arc or elliptical arc or another curve or straight line to each of both ends of a shape including circular arcs or elliptical arcs connected to both ends of the circular arc QR.

In Embodiment 5, the thin portion 12 is provided in the circumferential connection portion 6a and the outer peripheral side core portion 3. However, even in the core plates shown in Embodiments 1 to 4, the thin portion 12 may be provided in the circumferential connection portion 6a and the outer peripheral side core portion 3. That is, regarding the non-uniform thickness portion 12b at the outer peripheral side core portion 3 side of the thin portion 12, the shape of the rotation axis-side edge portion 10 of the circumferential connection portion 6a is not limited to the shape including the circular arc QR concentric with the outer shape of the core plate 1 and the circular arcs or elliptical arcs smoothly connected to both ends of the circular arc QR as in Embodiment 5, and, even in the core plate in which the edge portion 10 is formed in an elliptical arc as in Embodiments 1 to 4, the thin portion 12 provided in the circumferential connection portion 6a may be provided also in the outer peripheral side core portion 3, and the non-uniform thickness portion 12b of the thin portion 12 may be provided within the outer peripheral side core portion 3. Accordingly, the resistance of the core plate 1 to plastic deformation can be enhanced while the magnetic resistance of the connection portion 6 is increased thereby to further reduce a leakage magnetic flux due to a magnetic short circuit to improve the efficiency of the rotating electric machine.

The non-uniform thickness portion 12b of the thin portion 12 may be provided within the outer peripheral side core portion 3, and the other non-uniform thickness portion 12c of the thin portion 12 may be provided within the radial connection portion 6b. That is, at least the uniform thickness portion 12a of the thin portion 12 only needs to be provided within the circumferential connection portion 6a.

Embodiment 6

Figure 17:
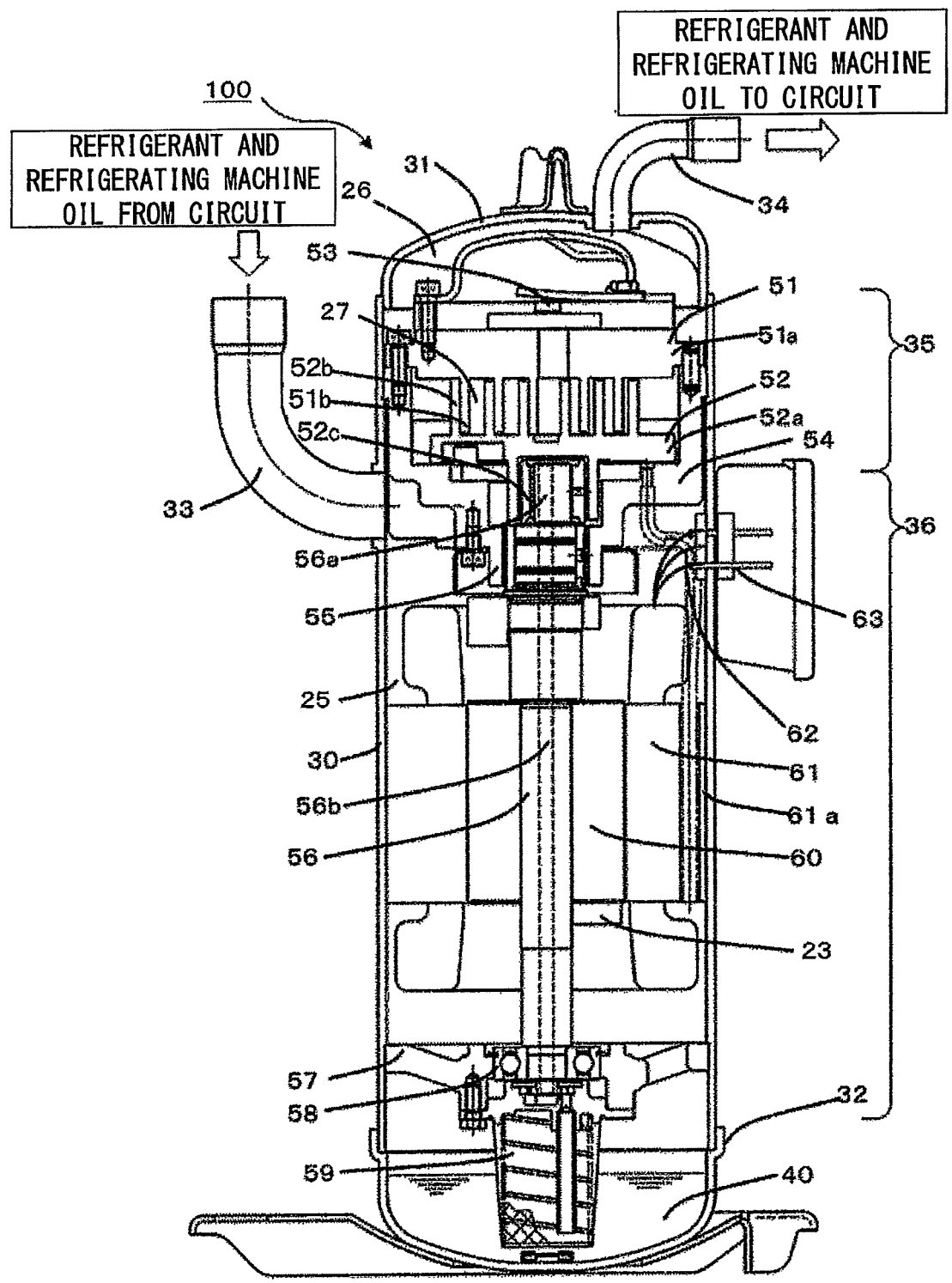
FIG. 17 is a cross-sectional view showing a vertical cross-sectional configuration of an electric compressor according to Embodiment 6 of the present invention.

Next, an electric compressor using a rotating electric machine including the rotor described above in Embodiments 1 to 5 will be described. FIG. 17 is a cross-sectional view showing a vertical cross-sectional configuration of the electric compressor according to Embodiment 6 of the present invention. The electric compressor 100 is used in a refrigeration/air-conditioning apparatus using a refrigeration cycle such as a freezer, a refrigerating apparatus, a water heater, or an air-conditioning apparatus. In addition, the electric compressor 100 includes a rotating electric machine including any of the rotors described in Embodiments 1 to 5.

The electric compressor 100 sucks a refrigerant that is a fluid, compresses the refrigerant into a high-temperature and high-pressure state, and discharges the refrigerant. In the electric compressor 100, a compression mechanism 35 and a drive mechanism 36 for driving the compression mechanism 35 are generally housed within a closed type casing. The casing includes an upper shell 31, a center shell 30, and a lower shell 32 and is formed as a pressure container. As shown in FIG. 17, the compression mechanism 35 is disposed at the upper side, and the drive mechanism 36 is disposed at the lower side. A bottom portion of the casing is formed as an oil pan for storing a refrigerating machine oil 40.

The compression mechanism 35 has a function to compress the refrigerant sucked from a suction pipe 33 and discharge the compressed refrigerant to a high pressure chamber 26 formed at the upper side within the casing. The refrigerant discharged to the high pressure chamber 26 is discharged through a discharge pipe 34 to the outside of the electric compressor 100. The drive mechanism 36 performs a function to drive a swing scroll 52, which forms the compression mechanism 35, in order to compress the refrigerant by the compression mechanism 35. That is, the compression mechanism 35 compresses the refrigerant by the drive mechanism 36 driving the swing scroll 52 via a shaft 56.

The compression mechanism 35 is schematically configured with a fixed scroll 51, the swing scroll 52, and a frame 54. As shown in FIG. 17, the swing scroll 52 is disposed at the lower side, and the fixed scroll 51 is disposed at the upper side. The fixed scroll 51 includes a base plate 51a and a spiral portion 51b that is a spiral projection erected on one surface of the base plate 51a. The swing scroll 52 includes a base plate 52a and a spiral portion 52b that is a spiral projection erected on one surface of the base plate 52a, and the swing scroll 52 is mounted within the casing such that the spiral portion 51b and the spiral portion 52b are engaged with each other. A compression chamber 27 the volume of which relatively changes is formed between the spiral portion 52b and the spiral portion 51b.

The fixed scroll 51 is fixed to the frame 54 by means of bolts or the like (not shown). The fixed scroll 51 has a discharge port 53 that is formed at a center portion thereof and through which the refrigerant compressed into a high pressure is discharged. The refrigerant compressed into a high pressure is then discharged to the high pressure chamber 26 that is provided above the fixed scroll 51. The swing scroll 52 makes a revolving motion without rotating relative to the fixed scroll 51. In addition, an eccentric hole 52c having a hollow cylindrical shape is formed in a center portion of a surface (hereinafter, referred to as thrust surface) of the swing scroll 52 opposite to the surface thereof on which the spiral portion 52b is formed. An eccentric pin portion 56a provided at the upper end of the shaft 56 described later is fitted into the eccentric hole 52c.

The frame 54 is fixedly attached to the inner peripheral side of the casing and has a through hole formed in a center portion thereof in order for the shaft 56 to penetrate therethrough. In addition, the frame 54 has an oil-return groove 61a formed so as to penetrate from the thrust surface side of the swing scroll 52 to the axially lower side, and the oil-return groove 61a returns the refrigerating machine oil 40 that lubricates the thrust surface, to the casing bottom portion. In FIG. 17, the case where only one oil-return groove 61a is formed is shown as an example, but the number of oil-return grooves 61a is not limited to one. For example, two oil-return grooves 61a may be formed. The frame 54 is preferably fixed to the inner peripheral surface of the casing by means of shrinkage fitting, welding, or the like of the outer peripheral surface thereof.

The drive mechanism 36 is schematically configured with the rotor 60 (any of the rotors of Embodiments 1 to 5) that is rotatably disposed at the inner peripheral surface side of a stator 61 and fixed to the shaft 56, the stator 61 that is vertically housed and fixedly held within the casing, and the shaft 56 that is a rotary shaft. The rotor 60 is fixed to the shaft 56, and is rotationally driven by starting current application to the stator 61, thereby rotating the shaft 56. In addition, the outer peripheral surface of the stator 61 is fixedly supported by the casing (the center shell 30) by means of shrinkage fitting or the like. That is, the rotor 60 and the stator 61 form a rotating electric machine according to an embodiment of the present invention.

The shaft 56 rotates with rotation of the rotor 60 to revolve the swing scroll 52. The shaft 56 is rotatably supported at the upper end thereof by a main bearing 55, which is located at a center portion of the frame 54, and at the lower end thereof by an auxiliary bearing 58, which is located at a center portion of a sub-frame 57 that is fixedly disposed below the center shell 30. The eccentric pin portion 56a, which is rotatably fitted into the eccentric hole 52c of the swing scroll 52, is formed at an upper end portion of the shaft 56. In addition, an oil-supply passage 56b is formed within the shaft 56 so as to extend to the upper end portion. The oil-supply passage 56b serves as a passage for the refrigerating machine oil 40 stored in the casing bottom portion.

An oil pump 59 for pumping up the refrigerating machine oil 40 with rotation of the shaft 56 is provided at the lower end side of the shaft 56. By the centrifugal pumping action of the oil pump 59, the refrigerating machine oil 40 is pumped up, flows through the oil-supply passage 56b, and is supplied to the compression mechanism 35. In addition, the suction pipe 33 for sucking the refrigerant is connected to the center shell 30, which forms the casing. The suction pipe 33 is open to a space (a low pressure chamber 25) within the shell. Furthermore, the discharge pipe 34 for discharging the refrigerant is connected to the upper shell 31, which forms the casing. The discharge pipe 34 is open to a space (the high pressure chamber 26) within the shell.

An Oldham ring (not shown) for blocking a rotating motion of the swing scroll 52 during an eccentrically revolving motion of the swing scroll 52 is provided between the swing scroll 52 and the fixed scroll 51. The Oldham ring is provided between the swing scroll 52 and the fixed scroll 51, and performs a function to allow a revolving motion of the swing scroll 52 while blocking a rotating motion of the swing scroll 52. That is, the Oldham ring serves as a mechanism to prevent rotation of the swing scroll 52. In addition, a sealed terminal 63 and a leak wire 62 for supplying power to the stator 61 are provided in the electric compressor 100.

Here, operation of the electric compressor 100 will be briefly described.

When a current is applied to the sealed terminal 63, power is supplied to the stator 61 through the leak wire 62. The rotor 60 rotates by receiving rotational force (torque) from a rotating magnetic field generated by the stator 61 supplied with the power. Accordingly, the shaft 56, which is supported by the main bearing 55 and the auxiliary bearing 58, is rotationally driven. The swing scroll 52 is engaged with the eccentric pin portion 56a of the shaft 56, and a rotating motion of the swing scroll 52 is converted to a revolving motion by the rotation prevention mechanism of the Oldham ring.

When the rotor 60 rotates, balance is kept for the eccentrically revolving motion of the swing scroll 52 by the balance weight 23 mounted on the lower surface of the rotor 60. That is, the balance weight 23 rotates together with the rotor 60 and has a function to take mass balance with respect to this rotation. As a result, the swing scroll 52, which is eccentrically supported on the upper portion of the shaft 56, is swung to start a revolving motion, and compresses the refrigerant by a known compression principle.

First, as a result of the rotational drive of the shaft 56, the refrigerant within the casing flows into the compression chamber 27, which is formed by the spiral portion 51b of the fixed scroll 51 and the spiral portion 52b of the swing scroll 52, and a suction process starts. The suction process starts by a low-pressure refrigerant gas being sucked from the outside via the suction pipe 33 and the interior of the low pressure chamber 25 into the compression chamber 27.

When the refrigerant gas is sucked into the compression chamber 27, the refrigerant gas shifts to a compression process in which the volume of the compression chamber 27 is reduced by compression action of the fixed scroll 51 and the swing scroll 52 due to a revolving motion of the swing scroll 52, which is made eccentric. That is, in the compression mechanism 35, when the swing scroll 52 makes the revolving motion, the refrigerant gas is sucked through an outermost periphery opening of the spiral portion 52b of the swing scroll 52 and the spiral portion 51b of the fixed scroll 51, and is moved toward the center portion, while being gradually compressed, with the revolution of the swing scroll 52.

Then, the refrigerant gas compressed in the compression chamber 27 shifts to a discharge process. That is, the compressed high-pressure refrigerant gas passes through the discharge port 53 of the fixed scroll 51 and the high pressure chamber 26 and then is discharged via the discharge pipe 34 to the outside of the electric compressor 100.

The low-pressure refrigerant gas within the low pressure chamber 25 and the high-pressure refrigerant gas within the high pressure chamber 26 are separated from each other by the fixed scroll 51 and the frame 54 such that airtightness is kept therebetween. Thus, the low-pressure refrigerant gas within the low pressure chamber 25 and the high-pressure refrigerant gas within the high pressure chamber 26 are not mixed within the casing. In addition, when the shaft 56 rotates, the refrigerating machine oil 40 is sucked and supplied through the oil-supply passage 56b, which is provided within the shaft 56, to the main bearing 55, the auxiliary bearing 58, and the like by the centrifugal pumping action of the oil pump 59, and then returns via the oil-return groove 61a into the lower shell 32 due to gravity. Then, when the current application to the stator 61 is stopped, the electric compressor 100 stops its operation.

Therefore, since the electric compressor 100 includes any of the rotors described in Embodiments 1 to 5, a leakage magnetic flux can be reduced and sufficient torque can be efficiently obtained. Similarly, the rotating electric machine included in the electric compressor 100 can achieve the same advantageous effects.

Embodiment 7

Next, a refrigeration/air-conditioning apparatus using the electric compressor described in Embodiment 6 will be described. In Embodiment 7, a so-called separate type air-conditioning apparatus in which an indoor unit and an outdoor unit are connected to each other by a refrigerant pipe, will be described as an example. The refrigeration/air-conditioning apparatus in which the electric compressor including the rotating electric machine of the present invention is used is not limited thereto, and may be a refrigeration/air-conditioning apparatus in another form using a refrigeration cycle such as a freezer or an air-conditioning apparatus in another form. In the separate type air-conditioning apparatus, the electric compressor is provided to the outdoor unit.

Figure 18:
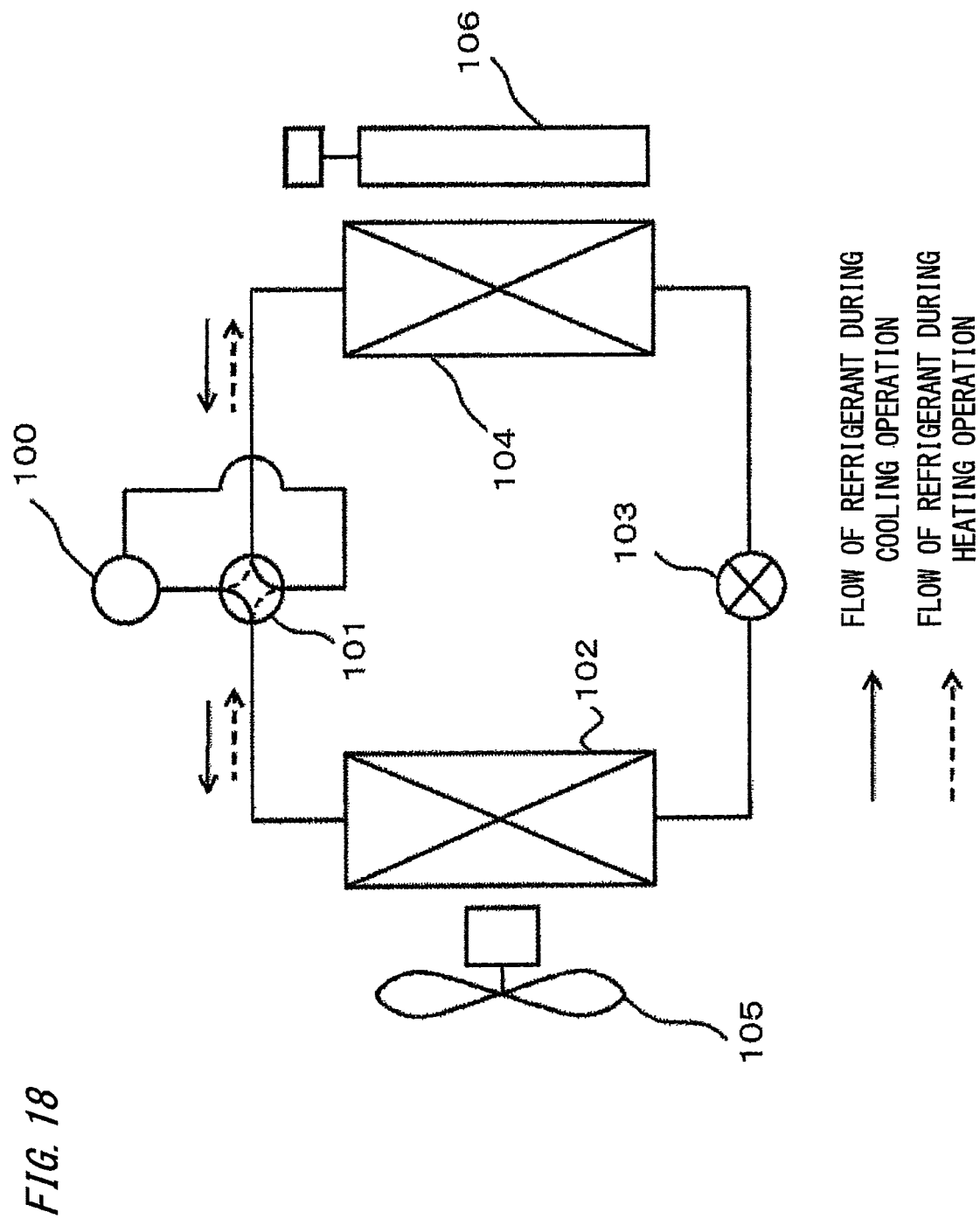
FIG. 18 is a refrigerant circuit diagram showing a refrigeration cycle of an air-conditioning apparatus according to Embodiment 7 of the present invention.
Figure 19:
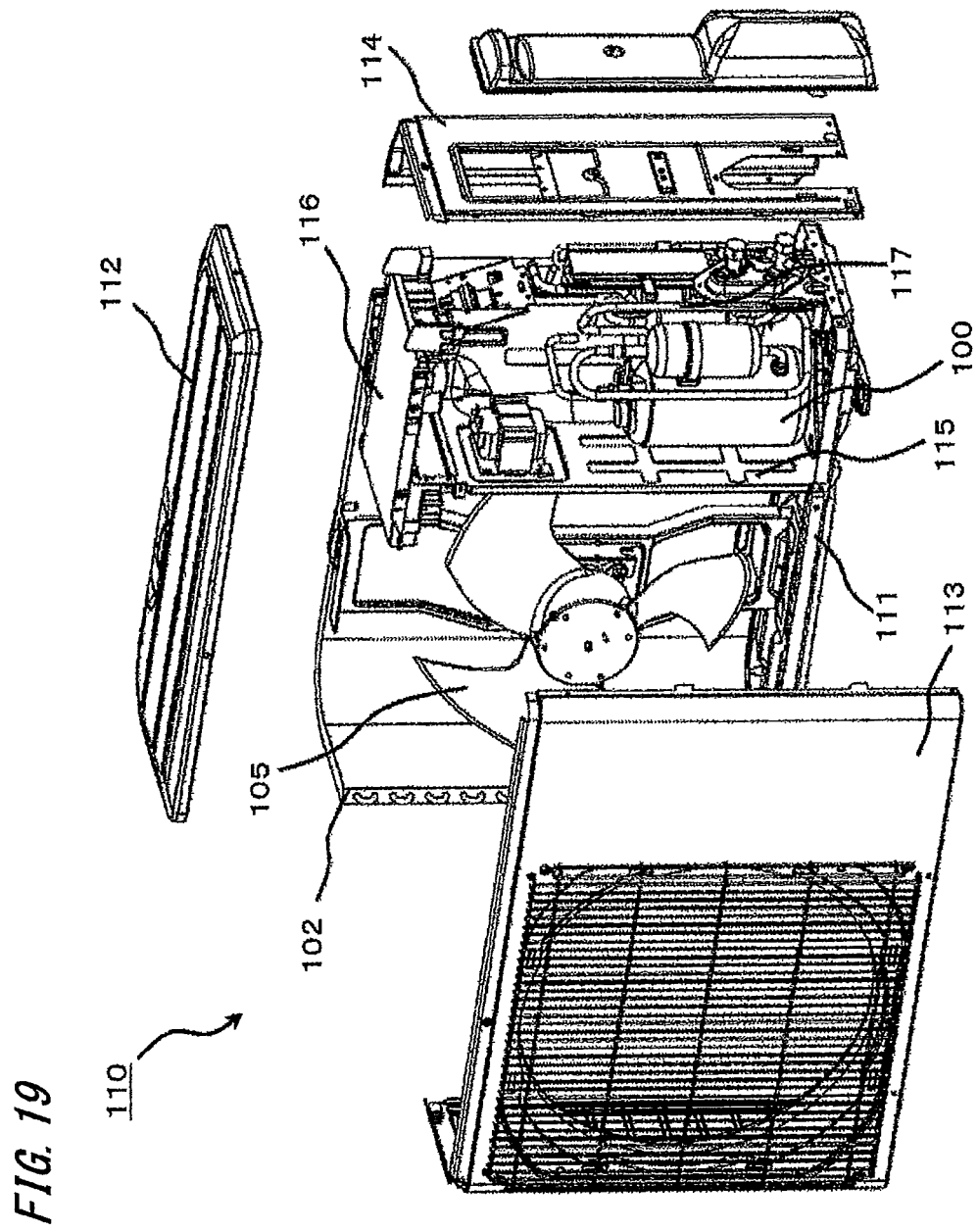
FIG. 19 is an exploded perspective view showing an outdoor unit of the separate type air-conditioning apparatus according to Embodiment 7 of the present invention.

FIG. 18 is a refrigerant circuit diagram showing a refrigeration cycle of the air-conditioning apparatus of Embodiment 7. FIG. 19 is an exploded perspective view showing the outdoor unit of the separate type air-conditioning apparatus of Embodiment 7.

As shown in FIG. 18, a refrigerant circuit of the air-conditioning apparatus forms the refrigeration cycle by sequentially connecting the electric compressor 100 for compressing the refrigerant described in Embodiment 6, a four-way valve 101 for switching the flow direction of the refrigerant between cooling operation and heating operation, an outdoor side heat exchanger 102 that serves as a condenser during cooling operation and serves as an evaporator during heating operation, a decompressor 103 (an electronically controlled expansion valve) that reduces the pressure of a high-pressure liquid refrigerant to make the liquid refrigerant into a low-pressure gas-liquid two-phase refrigerant, and an indoor side heat exchanger 104 that serves as an evaporator during cooling operation and serves as a condenser during heating operation.

Solid arrows in FIG. 18 represent the direction in which the refrigerant flows during cooling operation. In addition, dashed arrows in FIG. 18 represent the direction in which the refrigerant flows during heating operation.

An outdoor side air blower 105 is provided to the outdoor side heat exchanger 102, and an indoor side air blower 106 (a cross flow fan) is provided to the indoor side heat exchanger 104.

During cooling operation, the compressed high-temperature high-pressure refrigerant is discharged from the electric compressor 100 and flows through the four-way valve 101 into the outdoor side heat exchanger 102. In the outdoor side heat exchanger 102, outdoor air exchanges heat with the refrigerant while being passed between fins and tubes (heat-transfer pipes) of the outdoor side heat exchanger 102 by the outdoor side air blower 105, which is provided in an air passage of the outdoor side heat exchanger 102, whereby the refrigerant is cooled into a high-pressure liquid state, and the outdoor side heat exchanger 102 serves as a condenser. Thereafter, the refrigerant is reduced in pressure and becomes a low-pressure gas-liquid two-phase refrigerant, while passing through the decompressor 103, and then flows into the indoor side heat exchanger 104. In the indoor side heat exchanger 104, indoor air exchanges heat with the refrigerant while being passed between fins and tubes (heat-transfer pipes) of the indoor side heat exchanger 104 by driving the indoor side air blower 106 (cross flow fan), which is mounted in an air passage of the indoor side heat exchanger 104, whereby air to be blown out into an indoor space is cooled, and, on the other hand, the refrigerant takes heat from the air and evaporates into a gas state (the indoor side heat exchanger 104 serves as an evaporator). Thereafter, the refrigerant returns to the electric compressor 100. The indoor space is air-conditioned (cooled) by the air cooled in the indoor side heat exchanger 104.

During heating operation, by the four-way valve 101 being inverted, the refrigerant flows through the refrigeration cycle in the direction opposite to the flow of the refrigerant during cooling operation, the indoor side heat exchanger 104 serves as a condenser, and the outdoor side heat exchanger 102 serves as an evaporator. The indoor space is air-conditioned (heated) by air heated in the indoor side heat exchanger 104.

The configuration of an outdoor unit 110 of the air-conditioning apparatus will be described with reference to FIG. 19. The outdoor unit 110 of the air-conditioning apparatus includes the outdoor side heat exchanger 102 having a substantially L shape in a plan view, a bottom plate 111 (base) that forms a bottom portion of a housing of the outdoor unit 110, a flat plate-like top panel 112 that forms a top surface of the housing, a front panel 113 that forms a front and one side portion of the housing and has a substantially L shape in a plan view, a side panel 114 that forms another side portion of the housing, a separator 115 that separates an air passage (air blower chamber) and a machinery chamber from each other, an electronic component box 116 in which an electronic component is housed, the electric compressor 100 that compresses the refrigerant, refrigerant pipes/refrigerant circuit components 117 that form the refrigerant circuit, and the outdoor side air blower 105 that sends air to the outdoor side heat exchanger 102.

As described in Embodiment 6, the electric compressor 100 included in the outdoor unit 110 of the air-conditioning apparatus configured as described above includes the rotating electric machine provided with the rotor described in Embodiments 1 to 5 in which the leakage magnetic flux can be reduced and sufficient torque can be efficiently obtained. Thus, an air-conditioning apparatus that can efficiently perform a refrigeration cycle can be obtained.

Although the present invention has been specifically described on the basis of the embodiments, the present invention is not limited to the above-described embodiments, and various modifications may be made without departing from the gist of the present invention.

DESCRIPTION OF THE REFERENCE CHARACTERS 1 core plate
2 inner peripheral side core portion
3 outer peripheral side core portion
5, 5a, 5b, 5c magnet insertion hole
6 connection portion
6a circumferential connection portion
6b radial connection portion
7 void portion
9 permanent magnet
10 edge portion
11 minimum width portion
12 thin portion
12a uniform thickness portion
12b, 12c, 12d non-uniform thickness portion
20 rotor core
60 rotor
100 electric compressor
110 outdoor unit of air-conditioning apparatus

The invention claimed is:

1. A rotor comprising:
a rotor core configured by stacking a plurality of core plates in a direction of a rotation axis such that positions of magnet insertion holes coincide with each other, each core plate including
an inner peripheral side core portion provided at the rotation axis side of the core plate having a shape with n-fold symmetry about the rotation axis so as to correspond to a number of magnetic poles,
an outer peripheral side core portion provided at an outer peripheral side of the core plate so as to correspond to each magnetic pole,
the magnet insertion hole provided between the inner peripheral side core portion and the outer peripheral side core portion so as to correspond to each magnetic pole,
a radial connection portion provided between each magnetic pole, connected to the inner peripheral side core portion, and extending in a radial direction of the core plate,
a circumferential connection portion connected to the outer peripheral side core portion and the radial connection portion, extending in a circumferential direction of the core plate, having widths w1 and w2 in the radial direction at both ends thereof, including a minimum width portion having a width w3 in the radial direction smaller than the w1 and the w2, and having a width that smoothly decreases along a curve from both ends to the minimum width portion, and
a thin portion including a uniform thickness portion which is provided in the circumferential connection portion and which has a thickness tc over an entire width, in the radial direction, of the circumferential connection portion and a non-uniform thickness portion which is adjacent to the uniform thickness portion provided in the circumferential connection portion and which has a thickness increasing from tc to, the thin portion having the minimum width portion within the uniform thickness portion; and
permanent magnets embedded in the magnet insertion holes.

2. The rotor according to claim 1, wherein the core plate has a shape with line symmetry about a polar axis of each magnetic pole.

3. The rotor according to claim 2, wherein a shape of an edge portion of the circumferential connection portion at the outer peripheral side of the core plate is a circular arc having a center on the rotation axis, and a shape of an edge portion of the circumferential connection portion at the rotation axis side is an elliptical arc of an ellipse tangent to two straight lines that are drawn from both ends of the circumferential connection portion so as to be parallel to a direction in which the radial connection portion extends.

4. The rotor according to claim 3, wherein
when the ellipse has a length in the circumferential direction larger than a length thereof in the radial direction, a semi-major axis of the ellipse is a, a semi-minor axis of the ellipse is b, and an angle formed between two straight lines respectively drawn between two points on the major axis of the ellipse and the rotation axis is $\theta$, the angle $\theta$ and an ellipticity b/a satisfy relationships of the following mathematical expression and mathematical expression:

$$0°<\theta\leq36° \quad (1), \text{and}$$

$$\{1-\cos(\theta/2)\}/\sin(\theta/2)<b/a\leq\tfrac{1}{3} \quad (2).$$

5. The rotor according to claim 4, wherein the angle $\theta$ and the ellipticity b/a satisfy relationships of the following mathematical expression and mathematical expression:

$$0°<\theta\leq28° \quad (3), \text{and}$$

$$\{1-\cos(\theta/2)\}/\sin(\theta/2)<b/a\leq\tfrac{1}{4} \quad (4).$$

6. The rotor according to claim 1, wherein a shape of an edge portion of the circumferential connection portion at the outer peripheral side of the core plate is a circular arc having a center on the rotation axis, and a shape of an edge portion of the circumferential connection portion at the rotation axis side is an elliptical arc of an ellipse tangent to two straight lines that are drawn from both ends of the circumferential connection portion so as to be parallel to a direction in which the radial connection portion extends.

7. The rotor according to claim 6, wherein
when the ellipse has a length in the circumferential direction larger than a length thereof in the radial direction, a semi-major axis of the ellipse is a, a semi-minor axis of the ellipse is b, and an angle formed between two straight lines respectively drawn between two points on the major axis of the ellipse and the rotation axis is $\theta$, the angle $\theta$ and an ellipticity b/a satisfy relationships of the following mathematical expression and mathematical expression:

$$0°<\theta\leq36° \quad (1), \text{and}$$

$$\{1-\cos(\theta/2)\}/\sin(\theta/2)<b/a\leq\tfrac{1}{3} \quad (2).$$

8. The rotor according to claim 7, wherein the angle and the ellipticity b/a satisfy relationships of the following mathematical expression and mathematical expression:

$$0°<\theta\leq28° \quad (3), \text{and}$$

$$\{1-\cos(\theta/2)\}/\sin(\theta/2)<b/a\leq\tfrac{1}{4} \quad (4).$$

9. The rotor according to claim 6, wherein the ellipse has a major axis perpendicular to the direction in which the radial connection portion extends.

10. The rotor according to claim 1, wherein a shape of an edge portion of the circumferential connection portion at the outer peripheral side of the core plate is a circular arc having a center on the rotation axis, and a shape of an edge portion of the circumferential connection portion at the rotation axis side is a shape including a circular arc having a center on the rotation axis and having a first end portion and a second end portion, a circular arc or an elliptical arc connected to the first end portion, and a circular arc or an elliptical arc connected to the second end portion.

11. The rotor according to claim 10, wherein
the first end portion is an end portion at a side at which the circumferential connection portion is connected to the radial connection portion, and the elliptical arc is connected to the first end portion, and
the second end portion is an end portion at a side at which the circumferential connection portion is connected to the outer peripheral side core portion, and the circular arc is connected to the second end portion.

12. The rotor according to claim 11, wherein the elliptical arc is an elliptical arc of an ellipse having a major axis perpendicular to the direction in which the radial connection portion extends.

13. The rotor according to claim 1, wherein the thin portion is provided in the circumferential connection portion and the radial connection portion with a thickness tc.

14. The rotor according to claim 1, wherein the thin portion is provided in the circumferential connection portion and the outer peripheral side core portion with a thickness tc.

15. The rotor according to claim 1, wherein the magnet insertion hole has an I shape having a longitudinal direction perpendicular to the radial direction of the core plate.

16. The rotor according to claim 1, wherein the magnet insertion hole has a V shape which projects at a center side of the core plate.

17. The rotor according to claim 1, wherein the magnet insertion hole has a U shape which projects at a center side of the core plate.

18. A rotating electric machine comprising:
the rotor according to claim 1; and
a stator provided at an outer side of an outer periphery of the rotor.

19. An electric compressor comprising:
the rotating electric machine according to claim 18; and
a compression mechanism for compressing a fluid into a higher pressure by being rotated by the rotating electric machine.

20. A refrigeration/air-conditioning apparatus comprising:
the electric compressor according to claim 19;
a first heat exchanger which is provided at a high pressure side of the electric compressor and into which a high-pressure refrigerant flows from the electric compressor;
a second heat exchanger which is provided at a low pressure side of the electric compressor and from which a low-pressure refrigerant flows out to the electric compressor; and
a decompressor provided between the first heat exchanger and the second heat exchanger, for reducing a pressure of the high-pressure refrigerant flowing out from the first heat exchanger and causing the refrigerant to flow into the second heat exchanger.

* * * * *